United States Patent
Waisman-Diamond et al.

(10) Patent No.: US 9,015,855 B2
(45) Date of Patent: *Apr. 21, 2015

(54) SECURE TUNNELING PLATFORM SYSTEM AND METHOD

(71) Applicant: FON Technology, SL, Madrid (ES)

(72) Inventors: Martin Varsavsky Waisman-Diamond, Madrid (ES); Gonzalo Julián Bécares Fernández, Madrid (ES); Xabier Iurgi Arginzoniz Cebreiro, Madrid (ES); Juan Manuel Muñoz Castro, Madrid (ES); Pablo Martin Medrano, Madrid (ES)

(73) Assignee: FON Wireless Limited, London (GB)

( * ) Notice: Subject to any disclaimer, the term of this patent is extended or adjusted under 35 U.S.C. 154(b) by 303 days.

This patent is subject to a terminal disclaimer.

(21) Appl. No.: 13/676,958

(22) Filed: Nov. 14, 2012

(65) Prior Publication Data

US 2013/0239181 A1   Sep. 12, 2013

Related U.S. Application Data

(63) Continuation of application No. 13/339,807, filed on Dec. 29, 2011, now Pat. No. 8,910,300.

(60) Provisional application No. 61/559,460, filed on Nov. 14, 2011, provisional application No. 61/428,620, filed on Dec. 30, 2010.

(51) Int. Cl.
*G06F 21/00* (2013.01)
*H04L 9/00* (2006.01)
(Continued)

(52) U.S. Cl.
CPC ........ *H04L 63/083* (2013.01); *H04L 29/12367* (2013.01); *H04L 61/2514* (2013.01); *H04L 63/1425* (2013.01); *H04L 63/162* (2013.01); *H04L 63/30* (2013.01); *H04W 12/06* (2013.01)

(58) Field of Classification Search
CPC .................................. G06F 21/00; H04L 9/00
See application file for complete search history.

(56) References Cited

U.S. PATENT DOCUMENTS 6,184,710 B1 * 2/2001 Mendel ........................... 326/41
6,298,383 B1   10/2001 Gutman et al.
(Continued)

FOREIGN PATENT DOCUMENTS

CN   101399671   4/2009
EP   1 104 133 A1   5/2001
(Continued)

OTHER PUBLICATIONS

"Air Marshal version 2.0—Captive Portal System—Wireless Hotspots * Wired Networks * Device Authentication." *IEA Software, Inc.* Feb. 13, 2013. <http://www.iea-software.com/products/airmarshal1.cfm>.

(Continued)

*Primary Examiner* — William Powers
(74) *Attorney, Agent, or Firm* — Siritzky Law, PLLC

(57) ABSTRACT

A system identifies a user, even a user behind a wireless router, and provides a virtual tunnel over the internet for communication with the user. A data center at an Internet Service Provider may work in concert with a central data center to authenticate the user and to provide access, for example using a layer 2 tunneling protocol and a point-to-point data (PPP) link protocol. A layer 2 tunneling protocol network server (LNS) may provide public IP address translation services.

34 Claims, 26 Drawing Sheets

(51) Int. Cl.
*H04L 29/06* (2006.01)
*H04L 29/12* (2006.01)
*H04W 12/06* (2009.01)

(56) References Cited

U.S. PATENT DOCUMENTS

| | | | |
|---|---|---|---|
| 6,430,619 B1 | 8/2002 | Sitaraman et al. | 709/225 |
| 6,795,700 B2 | 9/2004 | Karaoguz et al. | |
| 6,842,770 B1* | 1/2005 | Serlet et al. | 709/203 |
| 6,934,530 B2 | 8/2005 | Engelhart | |
| 6,950,628 B1 | 9/2005 | Meier et al. | |
| 6,957,069 B2 | 10/2005 | Shah et al. | |
| 6,957,086 B2 | 10/2005 | Bahl et al. | |
| 6,961,575 B2 | 11/2005 | Stanforth | |
| 7,251,827 B1* | 7/2007 | Guo et al. | 726/8 |
| 7,263,076 B1 | 8/2007 | Leibovitz et al. | |
| 7,296,078 B2 | 11/2007 | Herrero et al. | |
| 7,302,229 B2 | 11/2007 | Riddles | |
| 7,568,218 B2 | 7/2009 | Garg et al. | |
| 7,924,780 B2 | 4/2011 | Waisman-Diamond | |
| 7,995,993 B1 | 8/2011 | Waisman-Diamond | |
| 8,091,116 B2 | 1/2012 | Kutt et al. | 726/2 |
| 8,179,840 B2 | 5/2012 | O'Neill | |
| 8,213,934 B2 | 7/2012 | Tsirtsis et al. | |
| 8,266,266 B2* | 9/2012 | Short et al. | 709/223 |
| 8,319,835 B2 | 11/2012 | Azuma et al. | 348/207.1 |
| 8,332,923 B2 | 12/2012 | Oba et al. | |
| 2001/0053683 A1 | 12/2001 | Murayama et al. | |
| 2002/0035617 A1* | 3/2002 | Lynch et al. | 709/219 |
| 2002/0075844 A1 | 6/2002 | Hagen | 370/351 |
| 2002/0138635 A1 | 9/2002 | Redlich et al. | 709/229 |
| 2003/0051041 A1 | 3/2003 | Kalavade et al. | |
| 2004/0052223 A1 | 3/2004 | Karaoguz et al. | |
| 2004/0122959 A1 | 6/2004 | Lortz | 709/229 |
| 2004/0133687 A1 | 7/2004 | Yamaguchi et al. | |
| 2004/0141617 A1 | 7/2004 | Volpano | |
| 2005/0021781 A1 | 1/2005 | Sunder et al. | |
| 2005/0050352 A1 | 3/2005 | Narayanaswami et al. | |
| 2005/0096048 A1 | 5/2005 | Clare et al. | |
| 2005/0177515 A1 | 8/2005 | Kalavade et al. | 705/52 |
| 2005/0204037 A1 | 9/2005 | Levy | |
| 2005/0220106 A1 | 10/2005 | Raverdy et al. | |
| 2005/0223086 A1 | 10/2005 | Raverdy et al. | |
| 2005/0232242 A1* | 10/2005 | Karaoguz et al. | 370/352 |
| 2005/0232283 A1 | 10/2005 | Moyer et al. | |
| 2005/0233740 A1 | 10/2005 | Jiang | |
| 2005/0250448 A1 | 11/2005 | Knauerhase et al. | |
| 2005/0260972 A1 | 11/2005 | Karaoguz et al. | |
| 2006/0041931 A1 | 2/2006 | Boxall et al. | |
| 2006/0223527 A1 | 10/2006 | Lee et al. | |
| 2006/0239254 A1* | 10/2006 | Short et al. | 370/352 |
| 2007/0008885 A1 | 1/2007 | Bonner | |
| 2007/0087756 A1 | 4/2007 | Hoffberg | |
| 2007/0094401 A1 | 4/2007 | Gagne et al. | 709/229 |
| 2007/0226320 A1* | 9/2007 | Hager et al. | 709/219 |
| 2007/0254624 A1* | 11/2007 | Le Creff et al. | 455/404.1 |
| 2008/0059445 A1* | 3/2008 | De Bellis | 707/4 |
| 2009/0172798 A1 | 7/2009 | Upp | |
| 2009/0279492 A1 | 11/2009 | Montemurro et al. | 370/329 |
| 2010/0017525 A1* | 1/2010 | Albert et al. | 709/229 |
| 2010/0106572 A1 | 4/2010 | van Hoff et al. | 705/14.4 |
| 2010/0235895 A1 | 9/2010 | Grassley et al. | 726/7 |
| 2010/0263022 A1 | 10/2010 | Wynn et al. | 726/3 |
| 2011/0047603 A1 | 2/2011 | Gordon et al. | 726/5 |
| 2011/0088003 A1 | 4/2011 | Swink et al. | 715/863 |
| 2011/0154454 A1 | 6/2011 | Frelechoux | 726/5 |
| 2011/0255459 A1 | 10/2011 | Gupta et al. | 370/312 |
| 2012/0054840 A1 | 3/2012 | Gupta et al. | 726/5 |
| 2012/0149334 A1 | 6/2012 | Zhang et al. | |
| 2012/0158979 A1 | 6/2012 | Lee et al. | 709/229 |

FOREIGN PATENT DOCUMENTS

| | | |
|---|---|---|
| EP | 1 241 903 | 9/2002 |
| EP | 1 357 720 | 10/2003 |
| EP | 1 411 676 | 4/2004 |
| EP | 1 550 264 | 7/2005 |
| EP | 1 643 719 | 4/2006 |
| EP | 2 051 473 | 4/2009 |
| EP | 2 051 473 A1 | 4/2009 |
| GB | 2440193 | 1/2008 |
| JP | 2007-049503 | 2/2007 |
| JP | 2007-281919 | 10/2007 |
| WO | WO 03/047294 | 6/2003 |
| WO | WO 2007/093216 | 8/2007 |
| WO | WO 2008/040697 | 4/2008 |
| WO | WO 2009/114976 | 9/2009 |
| WO | WO 2010/019084 | 2/2010 |
| WO | WO 2012/119450 | 9/2012 |

OTHER PUBLICATIONS

"Air Marshal—Authentication Gateway Version 2.0.40 Users Guide", *IEA Software, Inc.*

"Cellular Data Offload and Extending Wi-Fi Coverage with Devicescape Easy WiFi Case Study", *Devicescape Software, Inc.*, Oct. 2010.

International Search Report and Written Opinion dated Feb. 1, 2013.

http://www.pbs.org/newshour/bb/cyberspace/July-dec05/philadelphia_11-22.html, 6 pages. Nov. 22, 2005.

Notice of Reasons for Rejection dated Jun. 5 2012 in corresponding Japanese Patent Application No. 2011-102216 (with English language translation).

A. Perez-Mendez et al. "GSS-EAP pre-authentication for Kerberos." ABFAB, Mar. 2012, Accessed Oct. 10, 2013, <http://tools.ietf.org/pdf/draft-perez-abfab-eap-gss-preauth-01.pdf.

HighBeam Research, "Locals Surf Wi-Fi Wave: Businesses Give Away Web Access to Entice Paying Customers", HighBeam Research, copyright 2005, 4 pages.

http://www.pbs.org/newshour/bb/cyberspace/July-dec05/philadelphia.sub.--11- -22.html, 6 pages. Nov. 22, 2005.

http://www.bwianews.com/, 27 pages. Dec. 1, 2005.

http://www.cnn.com/2003/TECH/internet/12/11/sprj.ws.Wi-Fi.city.ap/, 2 pages.

Notice of Reasons for Rejection dated Jun. 5, 2012 in corresponding Japanese Patent Application No. 2011-102216 (with English language translation).

International Search Report and Written Opinion dated Mar. 6, 2012 in corresponding International Application No. PCT/EP2011/074318.

Canadian Intellectual Property Office (CIPO), Office action for Canadian Patent Application No. 2,820,378, Jan. 29, 2015 [5 pgs., including Examination Search Report].

* cited by examiner

SECURE TUNNELING PLATFORM SYSTEM AND METHOD

CROSS REFERENCE TO RELATED APPLICATIONS

The present application claims priority to U.S. Provisional Patent Application No. 61/559,460, filed Nov. 14, 2011. The present application is also a Continuation Application of U.S. application Ser. No. 13/339,807, filed Dec. 29, 2011 (issued as U.S. Pat. No. 8,910,300, Dec. 9, 2014), which claims priority to U.S. Provisional Application No. 61/559,460, filed Nov. 14, 2011 and U.S. Provisional Patent Application No. 61/428,620, filed Dec. 30, 2010, the entire contents of all of which are incorporated by reference herein.

BACKGROUND

1. Field of the Disclosure

The present application relates, generally, to network bandwidth sharing and, more particular, to secure tunneling and to identifying users.

2. Related Art

Sharing bandwidth, such as via Wi-Fi, is a practical solution that has benefits such as described in commonly assigned U.S. Pat. No. 7,924,780 issued Apr. 12, 2011, the entire contents of which is incorporated herein by reference. Users who access communication networks, such as the Internet, via Wi-Fi often share a public internet protocol ("IP") address. For example, a respective Internet Service Provider ("ISP") provides Internet access via one or a limited number of IP addresses. The Internet bandwidth is made available via a Wi-Fi access point. User A operates an IPOD TOUCH, and locates and accesses the Wi-Fi service to access a web page on the Internet. User B operates a laptop computer and locates the same Wi-Fi service to access a different web page on the Internet. The devices operated by User A and User B share the single public IP address provided by the ISP. In this example, it is impossible to determine which user (User A or User B) accessed which Internet web page because both users shared the same public IP address.

In the above example, two users operate different computing devices and access two different web pages at the same time. Unfortunately, the ISP can only detect the one IP address that is shared by and accessed both users. Therefore, the respective users cannot be identified.

SUMMARY

A device, a computer-readable medium, a system, a method, and means for implementing the method are disclosed for providing a virtual tunnel over the Internet for communications of the user using a user device, such as a handheld wireless device or a smart phone or other wireless or wired device or the like and for unambiguously identifying the user.

A system and method are provided for identifying respective users that access a communication network via Wi-Fi or other sharing of bandwidth, even when both users share the bandwidth, simultaneously. The system and method in accordance with the teachings herein further provide identification and disclosure of respective users that use bandwidth provided via Wi-Fi service, including bandwidth that is provided on a single or a limited number of shared public IP addresses.

A method according to the disclosure includes sending by user via the user's device a request for authentication and remotely web server authenticating the user's credentials, and if successful, sending an HTTP redirect request to the user's browser on the user device, including sending a random one time password hash for authorizing the user. The user's browser then sends the authorization request to the configured router's captive portal via HTTP, including the password or password hash and tunnel authorization provided by the configured router communicating with the user's device at the user's premises establishing an L2TP tunnel to a primary system layer 2 tunneling protocol network server at the Internet Service Provider data center, the configured router sending a PPP authorization request to the LNS over the established L2TP tunnel, the request including the password, the LNS sending authorization radius request to a remote central data center away from the premises of the ISP data center, the remote data center confirming the authorization and the LNS router accepting the PPP tunnel and assigning a private IP address to the PPP session for the user.

Accordingly, the internet access for authenticating the user proceeds by the user sending a request through the internet through the configured router at the user's premises and encapsulating the request in the PPP tunnel previously established. At this point, the LNS performs a translation of the private IP address and port into a public IP address, for example using a Port Address Translation. A PAT log can be stored at a different server or at a same server, for example, at a disclosure server, and the LNS forwards the request of the internet, receives a reply, reversing the IP translation and the LNS responding to the configured router through the PPP tunnel so that the reply may be forwarded to the user's device.

The present application includes a network tunneling platform which provides a router that is configured to provide user identification over a communication network, even when a user the user's computing device is behind one or multiple NAT services. Registered user identification information is received and stored in one or more databases. Accordingly, network users are subscribers and, therefore, can be identified unequivocally. For example, users are authenticated by providing a username and password, and may be authorized to share other user's network bandwidth at no additional cost, or for a small fee, depending upon the user's authenticated status. The teachings herein provide for relating the user's connection IP address and TCP/UDP port with the user's authentication information (e.g., user name and password) in order to identify the user.

Users identification capability provided in accordance with the teachings herein provides compliance with the security policies and legal requirements of even the strictest Internet service provider.

At least in part, user identification information is provided via a PPP session that is provided via a layer 2 tunneling protocol ("L2TP") tunnel. Each user session is established via a L2TP tunnel, which provides an independent internet protocol ("IP") address to each PPP tunnel and, accordingly, to each user. User credentials and a respective session IP address are logged by, for example, a Remote Authentication Dial In User Service ("RADIUS") server that may also support authentication and accounting processes.

The tunneling solution in accordance with the teachings herein also provides an environment that has limited IP addresses available. Public IP address conservation may be provided by assigning private IP addresses to each user. In this embodiment, the respective private IP addresses are translated, for example, via one or more network addresses translation ("NAT") servers, to one or more public IP addresses before network traffic reaches the Internet. In an embodiment, multiple private IP addresses are NATed with a single public IP address (also called PAT or NAT overload). By providing a NAT accounting log, unequivocal user identification is provided.

Although many of the examples herein relate to IP conservation, embodiments that do not provide or otherwise support NAT translation to support a limited or otherwise reduced number of IP addresses may be less complex and expensive by simply assigning independent public IP addresses to users connected at any given time, instead of translating private IP addresses via NAT and sharing one or more public IP addresses.

In addition, the infrastructure in an embodiment provides substantial availability as a function of redundancy for, for example, datacenter and communication providers. Substantial scalability is also supported, for example, to support hundreds off thousands of concurrent users by adding network equipment that, for example, terminates the tunnels with Configured routers. In case of a lower number of concurrent users, the system is adjustable, as well as platform costs, to scale appropriately in terms of functionality and cost.

In an embodiment, a Configured router in accordance with the teachings herein sends a RADIUS request to the System's RADIUS proxy server, and obtains configuration profile information therefrom, including for example white-listed domains, welcome page uniform resource locator ("URL"), L2TP server ("LNS") details, or the like. The system's RADIUS proxy sends the configuration profile to the Configured router. In the event that a user sends a hypertext transport protocol ("HTTP") request to a domain that a user is allowed or otherwise authorized to access (a "white-listed" domain), the Configured router forwards the request to the user, which translates the traffic via NAT with the router's public IP address and will forward it to the Internet. The HTTP response is sent to the user's browser.

In the event a user attempts to access a non-white-listed domain, the Configured router's captive portal intercepts the request and sends to the user's browser a HTTP redirect, for example to a hypertext markup language ("HTML") Welcome Page. The user's browser requests the Welcome Page and a secured ("HTTPS") Welcome Page is provided to the user. In an embodiment, a user inserts his/her credentials (e.g., Username and Password) at the Welcome Page. One or more web servers perform an authentication process by accessing the user's credentials in the system's database. If the authentication is successful, the web server sends a HTTP redirect request to the user's web browser software application, which includes a random one time password hash that is used during the authorization phase. The user's browser sends an authorization request to the Configured router's captive portal, via HTTP, and includes the one time password.

Once authenticated, the Configured router establishes a L2TP tunnel to its primary system LNS, in the case, for example, a tunnel has not already been established by a previous connection. If the connection to the primary LNS fails, the Configured router preferably attempts to connect to a secondary LNS. The Configured router sends a PPP authorization request to the LNS over the L2TP tunnel, and may include the one time password. In response, the LNS transmits an authorization RADIUS request to the system RADIUS proxy at, for example, an ISP. In an embodiment, the ISP is a partner with a provider or proprietor of the system and method in accordance with the teachings herein.

Continuing with this embodiment, the RADIUS proxy at the ISP forwards the authorization request to a RADIUS server provided or otherwise managed by a provider or proprietor of the system and method in accordance with the teachings herein, which may be located anywhere in the world, via an encrypted virtual private network ("VPN"), established between the DCR routers. In case authorization is successful, the RADIUS proxy provide by the System sends back an access-accept to the RADIUS proxy at the ISP, via the encrypted VPN. Thereafter, the RADIUS proxy at the ISP forwards the access-accept packet to the LNS, which accepts the PPP tunnel and assigns a private IP address to the PPP session.

In an embodiment, captive portal authorization is supported. For example, the Configured router transmits a RADIUS authorization request to the RADIUS proxy at the ISP, including the One time password, described above. The RADIUS request is forwarded to the a RADIUS proxy server provided or otherwise managed by provider or proprietor of the system and method in accordance with the teachings herein. The request is expected to be accepted, since the credentials are preferably the same as credentials used to authorize the PPP tunnel, described above. Access-accept packet(s) are sent to the System RADIUS proxy, which may be located anywhere in the world, and then transmitted to the Configured router. The access-accept packets preferably include the user's network profile. Thereafter, the Configured router provides Internet access for the respective user, which may include a static network address translation ("NAT") between the private IP address assigned to the PPP session by the LNS, and the private IP address assigned to the user's device by the Configured router via the dynamic host control protocol ("DHCP").

Once the user is authenticated, the user sends a request to the Internet through the Configured router. The request is encapsulated in the PPP tunnel that is described above. The LNS performs a port address translation ("PAT") for the request, and translates the private IP address and port in the request into a public IP address (which may be on a different port). Thereafter, a PAT log is stored at the disclosure server. The request is forwarded over the Internet to a respective server, such as a HTTP server, and a response is transmitted therefrom, over the Internet and for another PAT process. The IP (and port) translation is effectively reversed, and the LNS transmits the response to the Configured router through the PPP tunnel. The Configured router forwards the response to the user's software application.

Thus, and as described in connection with the above example embodiment, the teachings herein provide for a user connection flow that includes access to white-listed and non-white-listed domains, and user authentication and authorization, including web server authentication, tunnel authorization and captive portal authorization.

In an embodiment, an integration of at least three session accountings are included. One is a PPP session accounting that is by one or more RADIUS servers managed or maintained by a proprietor of the teachings herein. A second is a captive portal session accounting that is generated by the System's RADIUS server(s) as well. A third is a NAT accounting, that is provided by LNS router. The PPP session accounting may include at least a user's session start time, stop time and the respective LNS's IP address where the PPP session finishes. The PPP session accounting may also include the CPE IP address which is the tunnel IP source for the LNS, because of the CPE is translating (NAT) Configured router wide area network ("WAN") IP address. Other information included in the PPP session accounting is the private IP address assigned to the Configured router by the LNS for the PPP session, the user's username, the type of accounting packet and a unique session identifier (which may be the same as for the Captive Portal session).

In an embodiment, a captive portal manages user authorization and accounting at the Configured router. The captive portal sessions accounting preferably includes one or more of: the user's session start time, the session stop time, the user's username, the user's device type (Smart Phone, etc) and media access control ("MAC") address, the user's CPE MAC address, the user's computing device (Smart Phone, etc) IP address, assigned by the Configured router via DHCP and a unique session identifier (same as described above in connection with the for the PPP session).

Moreover, the NAT translation sessions accounting is generated by the LNS router and includes one or more of: the translation creation time, the translation deleting time, the type of accounting (e.g., NAT Creation or NAT Deletion), the layer 4 communication protocol (UDP or TCP), the PPP session IP address (internal address) and the port, the LNS public IP address used for the translation and the port, and the Internet IP address that the user is reaching, and the port.

Thus, in accordance with the respective sessions accountings, user tracking and identification is provided. For example, the user's public IP address, TCP or UDP port, and a time frames are known in advance. Using that information, the teachings herein locate the private IP address that is assigned to the PPP session, which relates to a single PPP session, provided the time frame is appropriate (i.e. given a 24 h time frame, there may be several PPP sessions which have shared the same private IP address at different times). Moreover, using the PPP session IP address, the PPP session accounting for that IP address can be determined, and the user's username and CPE address can be determined.

Moreover, in case further information is required (i.e. user device's MAC address) the Unique-Session-ID can be obtained and the Captive Portal's user session which has the same Unique-Session-ID can be located. The user device's MAC address and the Configured router's MAC address can, therefore, be identified.

Moreover, the teachings herein provide for a "Live platform" that includes a modular design in order to facilitate scalability and redundancy. In an embodiment, an LNS sub-platform terminates the L2TP PPP tunnels that are originated at the Configured routers. The LNS sub-platform may also assign a private IP addresses to the users' sessions, translate private IP addresses into public ones, generate NAT accounting and forward it to an external Syslog, authenticate users' sessions by using RADIUS protocol and generate sessions accounting by using RADIUS protocol.

An information technology ("IT") services sub-platform may also be provided including one or more configured router/firewall that may provides encrypted tunnels (Gre/IPSec) with the System's platform for secured RADIUS authentication and other transactions. The IT services platform may also implement one or more firewall capabilities in order to protect the servers installed at the datacenters. The IT services platform may also include a RADIUS proxy server that, in an embodiment concentrates RADIUS authentication and accounting, and forwards information relating thereto to the SYSTEM RADIUS proxy that is maintained or managed by provider or proprietor of the system and method in accordance with the teachings herein, and which may be located anywhere in the world. Further, a monitoring server may be included that is configured to check the health status of the network and server devices, and to forward the information to a centralized monitor platform, which may be maintained or managed by provider or proprietor of the system and method in accordance with the teachings herein. Moreover, a disclosure server may be included that stores information required for a disclosure action (RADIUS logs, NAT accounting, etc), and that provides a secured web interface for data extraction.

In addition to the LNS sub-platform, border switches, the platform described herein is configured to aggregate traffic from the LNS and IT Services sub-platform, as well as to provide IP connectivity with the ISP aggregation platform, and to provide inter-datacenter connectivity for redundancy purposes.

The present application is further described and illustrated in connection with accompanying Appendix A and Appendix B, the entire contents of which are hereby incorporated by reference. In Appendix B, for example, PPPoE technology is substituted for PPP and L2TP. Moreover, a single customer provided equipment from an ISP (e.g., "CPE") device is substituted for a combination of a second router device (e.g., a "Fonera" device) and a "CPE." This embodiment is more efficient and less costly, for example, due to a reduction in equipment.

In accordance with the teachings herein, a system and method are provided for identifying respective users that access a communication network via Wi-Fi or other shared bandwidth. Individual users of Wi-Fi service via shared public IP address(es) can be identified and disclosed, for example, to civil authorities.

Other features and advantages of the present invention will become apparent from the following description of the invention that refers to the accompanying drawings.

DETAILED DESCRIPTION OF THE EMBODIMENTS

Figure 1:
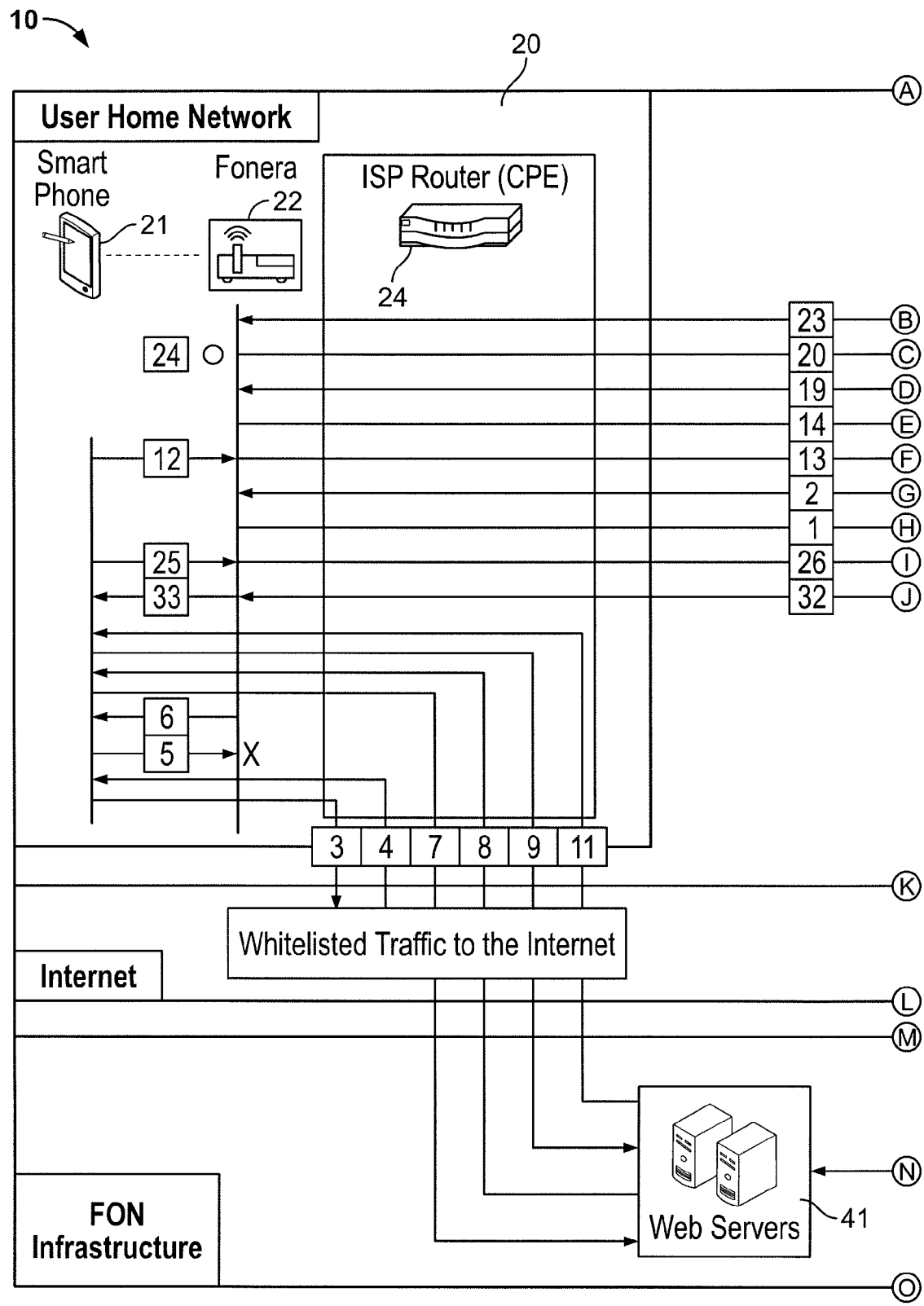
FIG. 1 is an example of an overview of a user connection flow diagram and major structures of a system according to an aspect of the disclosure.
Figure 1:
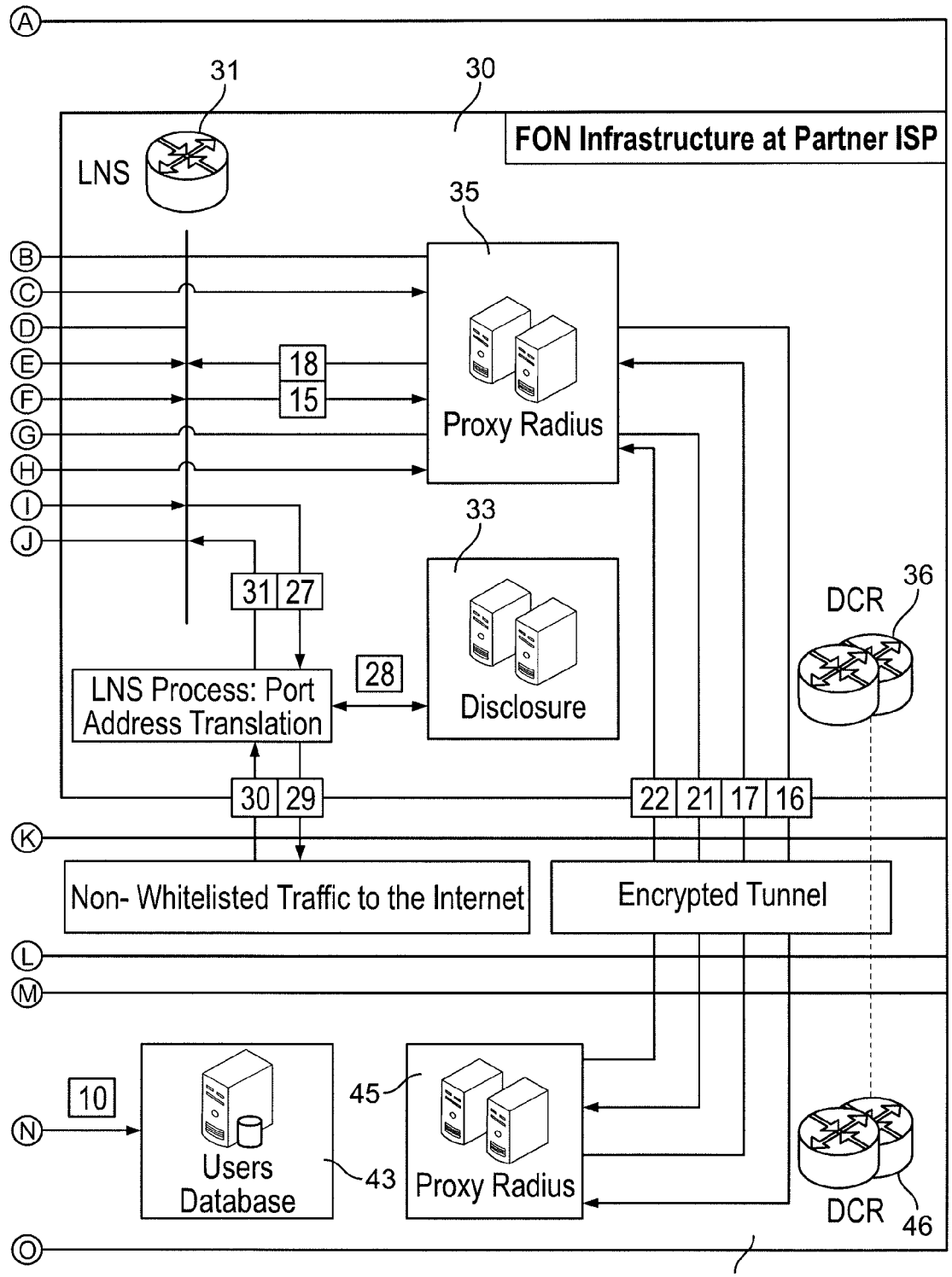
Figure 2:
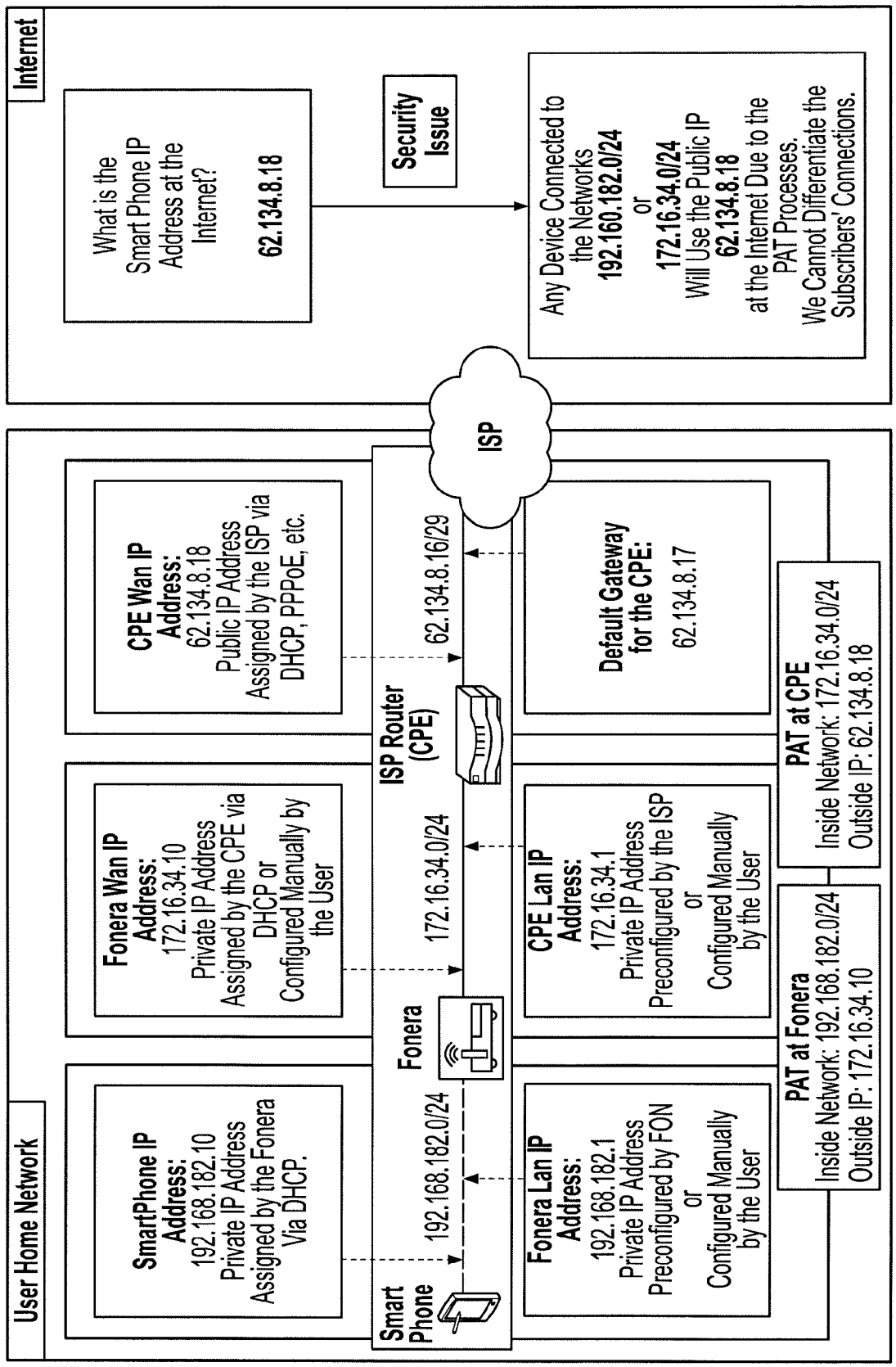
FIG. 2 is an example of a layer 2 tunneling protocol according to an aspect of the disclosure.

An example of a user connection flow of tunnel authorization, user identification and access through the layer 2 tunneling protocol network server (LNS) will now be described with reference to FIG. 1 and FIG. 10. A configured router 22, such as a wireless router, may be positioned in a user's home or office so as to provide access to a user's device, such as a smart phone, laptop, desktop or other type of handheld device 21. While described herein as a wireless router 22, it will be understood that a wired connection may also be provided. Further, more than one such user device 21 may share the same connection to the internet via wireless router 22. Similarly, more than one device may share the connection through ISP router 24, indicated in FIG. 1 as ISP Router CPE (Customer Premises Equipment), which also may be provided at the user's premises 20.

Figure 10A:
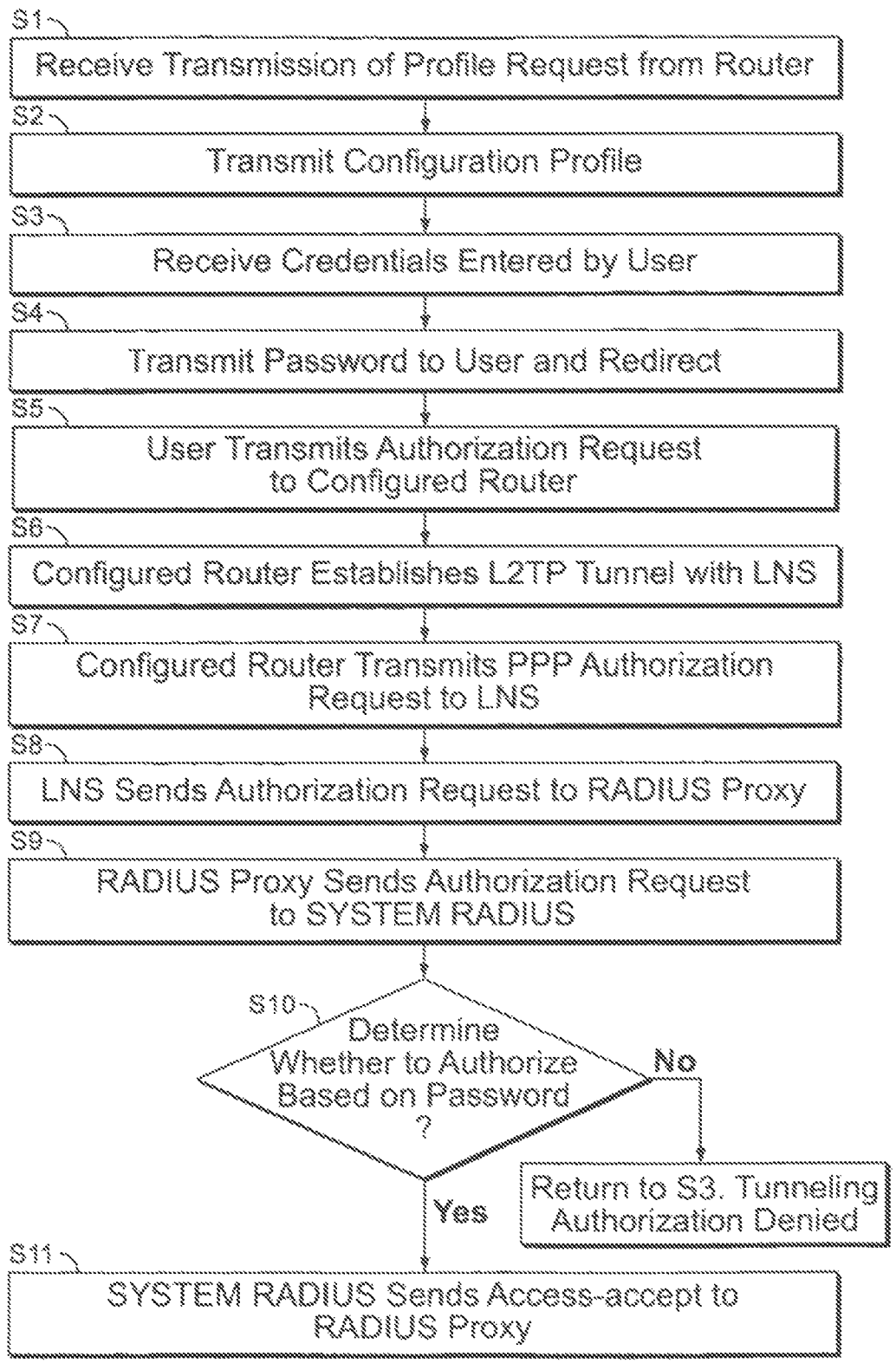
FIGS. 10A-C is a flow chart illustrating an example of a process flow according to an aspect of the disclosure.

Using the browser of the user device 21, user attempts to connect to the internet through wireless router 22 as illustrated by communication arrow 1 in FIG. 1. Configured router 22 sends a RADIUS request to the system's radius PROXY server, which may be located at an ISP (Internet Service Provider). While described herein as a RADIUS proxy, it would be understood that other types of authentication of the user may also be provided and that other types of servers can also fulfill this function. This transmission of the router for the profile request is illustrated in FIG. 10A, step S1. In response, the system RADIUS proxy 35 at the ISP sends a configuration profile to the configured router 22, as shown in step 2 of FIG. 10 and in communication arrow 2 in FIG. 1.

According to an aspect of the present disclosure, the user is now free to transmit HTTP requests to white-listed domains and configured router 22 will transmit such requests to ISP router 24, which NATs the request with its own public IP address and forwards it to the internet. During the profile configuration in step 2, the server at the ISP has sent to the configured router 22 information such as a list of white-listed domains which may be acceptable without further security measures, a welcome page URL, and details for the layer 2 tunneling protocol network server 31. Thus, requests from configured router 22 for white-listed domains according to this aspect of the invention will be responded to, as illustrated in communication arrow 4 in FIG. 1.

On the other hand, if configured router 22 transmits an HTTP request for a non-white-listed domain as illustrated in communication arrow 5, the configured router's captive portal intercepts this request of the user's browser using the captive portal service, and transmits to the user's browser an HTTP redirect to the welcome page, as illustrated in communication arrow 6. As illustrated in communication arrow 7 in FIG. 1, the user's browser requests the welcome page, and the HTTPs welcome page is shown to the user as indicated by communication arrow 8.

At this point, the user can insert his or her credentials, such as user name and password, for example issued by the user's ISP or as otherwise provided to the user, entered on the welcome page, as indicated by communication arrow 9. The welcome page may be sent by web server 41 located at a location different from the ISP's data center 30, for example the web server 31 may be located at a central data center 40 that provides services to support identification of the user and tunneling as described herein. It may be located anywhere in the world, or in the alternative, it and/or the other equipment illustrated in FIG. 1 as being a part of data center 40 may be located at the ISP's premises. FIG. 1 illustrates a web server 41, user database 43 and proxy RADIUS 45, as well as DCR 46 as being located at the central data center 40. The user's welcome page is shown in FIG. 1 as being transmitted from web servers 41 located at the central location 40.

Using user equipment 21 at user's premises 20, the user can enter her credentials, as discussed above, and these credentials can be forwarded to web servers 41, which then processes the credentials to authenticate the user by accessing a database, such as user database 43, as illustrated in communication arrow 10 and as illustrated in step 3 of FIG. 10A. In response, web server 41 authenticates the user, if the authentication is successful, by transmitting a password or a one time password hash as shown in FIG. 10A, and as illustrated in communication arrow 11 in FIG. 1. In addition, the web servers 41 redirect the HTTP request to the user's browser 21. At this point, as illustrated in communication arrow 12, user's browser sends an authorization request to the configured router's captive portal via HTTP (or using another protocol), and the request includes the one time password received from web server 41. The configured router's captive portal will receive the authorization request, which includes the one time password received from web server 41, as illustrated in step S5 of FIG. 10A.

As illustrated in FIG. 10A, step 6, configured router 22 establishes the L2TP tunnel with LNS 31 at the ISP data center, in case this has not already been established by a previous connection. This communication is illustrated by communication arrow 13 in FIG. 1. If connection to the primary LNS fails, configured router 22 attempts to connect to its secondary LNS. Configured router 22 sends a PPP (Point-to-Point Protocol) session authorization request to the LNS over the L2TP tunnel that has been established, as described at S7 of FIG. 10A and as illustrated in FIG. 1 as communication arrow 14. This authorization request includes a one time password received from the user device.

LNS 31 will then attempt to send an authorization RADIUS request to the system RADIUS proxy 35, which may be located at the ISP data center 30. This is shown as communication arrow 15 in FIG. 1 and described as step S8 in FIG. 10A. In response, system RADIUS proxy 35 forwards the request to the SYSTEM RADIUS at the central database 40 via encrypted VPN (virtual private network) established between DC routers located at the ISP data center 30 and at the central data center 40. This is illustrated in step 9 in FIG. 10A and as communication arrow 16 in FIG. 1. At this point, the determination is made whether to authorize based on the password received in the request, as illustrated in step S10 of FIG. 10A, and if an affirmative decision is made, the system RADIUS proxy 45 at central data center 40 signals RADIUS proxy at the ISP of the axis-accept, and this is forwarded to LNS 31, as illustrated in FIG. 1 by communication arrow 18 and as described at S11 in FIG. 10A. LNS 31 accepts the PPP tunnel in response to the access-accept message received from the RADIUS proxy 35 and assigns a private IP address to the PPP session for user device 21, as indicated by communication arrow 19 in FIG. 1 and as illustrated in step S13 of FIG. 10B.

A captive portal authorization will now be described with reference to communication arrows 20-24 illustrated in FIG. 1 configured router 22 sends a request for RADIUS authorization request to the RADIUS proxy 35 at the ISP data center 30, the request including the one time password received earlier, as shown in communication arrow 20 in FIG. 1. This is described as S14 in FIG. 10B. In response, the radius request is forwarded by RADIUS proxy 35 to the system RADIUS proxy 45 at the central data center. This request should always be accepted since the credentials sent, including the password, are the same as the PPP authorization credentials. The access-accept packet is sent back from proxy RADIUS 45 to proxy RADIUS 35 at the ISP as illustrated in communication arrow 22 of FIG. 1 and the access-accept is sent to configured router 22, including the user's network profile, as indicated in communication arrow 23 of FIG. 1. These steps are shown as steps S16-S18 in FIG. 10B. At this point, as indicated in communication arrow 24 in FIG. 1, configured router 22 configures the internet access for user device 21, and this configuration includes providing a static NAT between the private IP address assigned to the PPP session for user device 21 by LNS 31 and the private IP address assigned to user device 21 by configured router 22 via DHCP.

Access is provided to the internet for authenticated users as described below. As indicated by communication arrow 25 in FIG. 1, user sends a request for accessing a target on the internet via configured router 22, as indicated by communication arrow 25 in FIG. 1 as shown in step 19 of FIG. 10B. The request may be encapsulated in the PPP tunnel earlier established, as indicated by communication arrow 26 in FIG. 1 and as described in step 20 in FIG. 10B. In response, LNS 31 performs a PAT (Port Address Translation) for the internet request from the user, thus translating the request's private IP address and port into a public IP address (which also may be on a port different from the private IP address), as indicated by communication arrow 27 in FIG. 1 and as described at S21 in FIG. 10B. In this connection, a PAT log will be stored at disclosure server 33 at the ISP, as indicated in communication arrow 28 in FIG. 1, and as described in step S22 in FIG. 10B. The request is forwarded to the internet by LNS 31, as indicated by communication arrow 29 in FIG. 1 and as shown in step S23 in FIG. 10B.

Figure 10B:
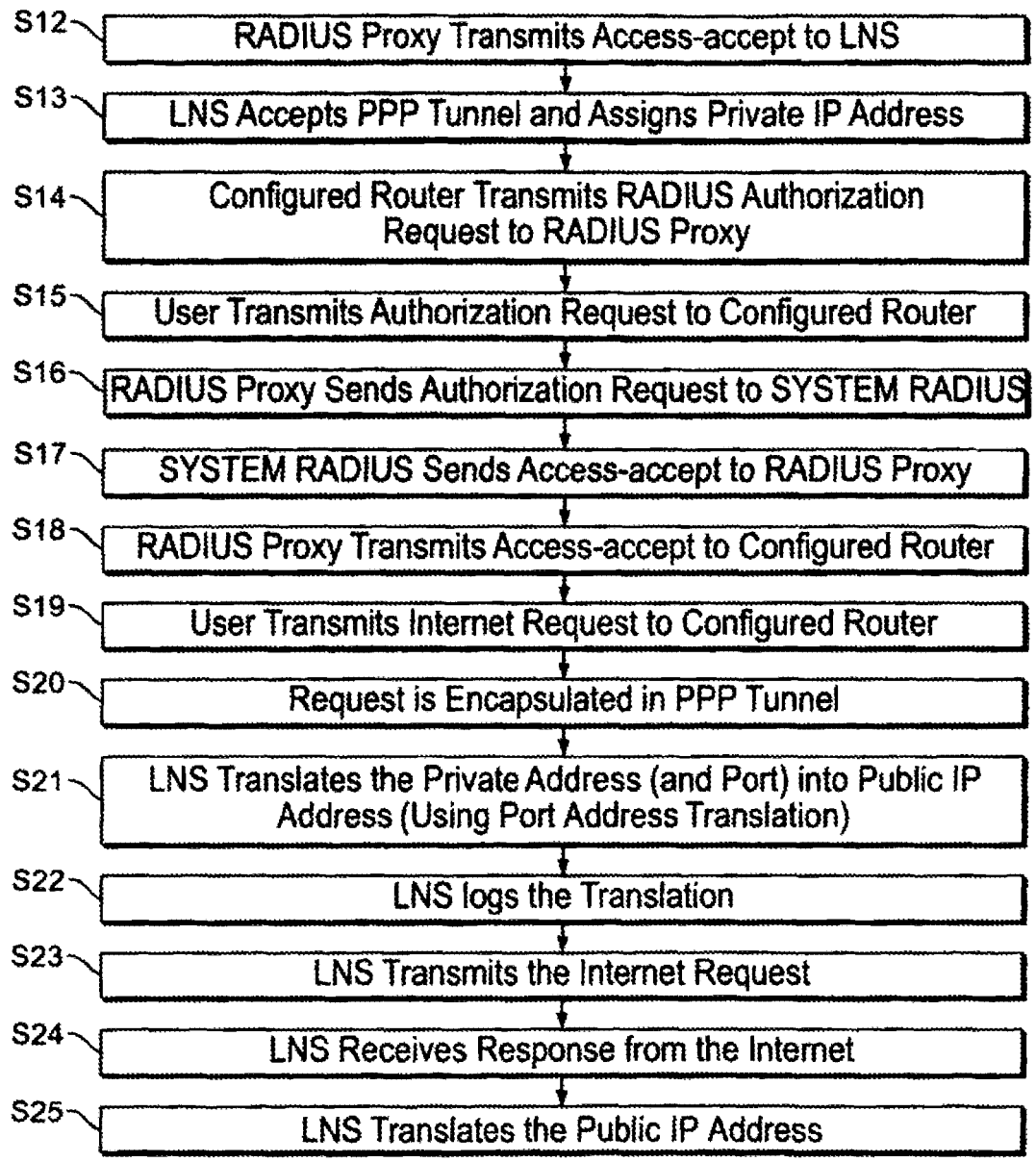
Figure 10C:
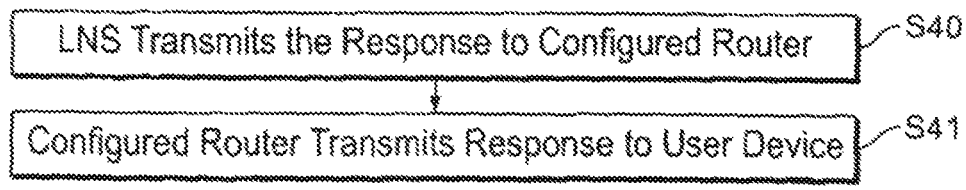

LNS 31 receives a response from the internet responsive to the internet request, and LNS 31 proceeds through the PAT process, as shown by communication arrow 30 and as indicated in steps S24 and S25 in FIG. 10B. Thus, the IP translation is reversed and the LNS now again has the private IP address of user device 21. As indicated by communication arrow 32 in FIG. 1, LNS 31 transmits a response to the internet request to configured router 22 through the PPP tunnel, as indicated in S40 in FIG. 10C. The configured router 22 then forwards the response to the user device 21.

Live Platform

Figure 4:
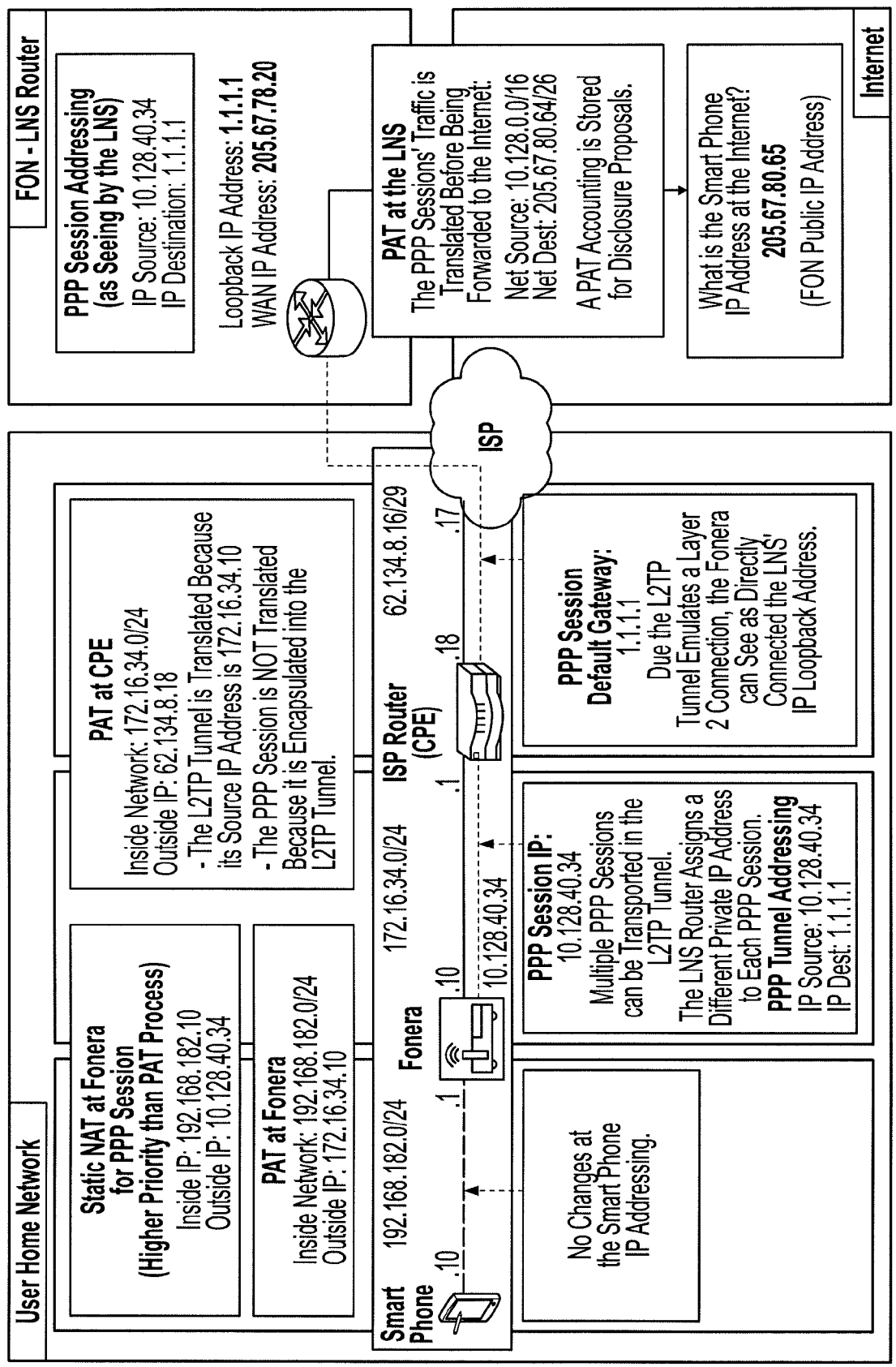
FIG. 4 is an example of a live platform map representing IP connections and system modules at data centers according to an aspect of the disclosure.

Also contemplated is a live communication platform with a modular design to facilitate scalability of the system and to provide redundancy of solution. The live platform can include LNS sub-platform that terminates the L2TP and PPP tunnels originated at configured router 22. A layer 3 live platform map is illustrated in FIG. 4. FIG. 4 represents IP connections in system cabinets at the ISP data center and a central data center.

Figure 5:
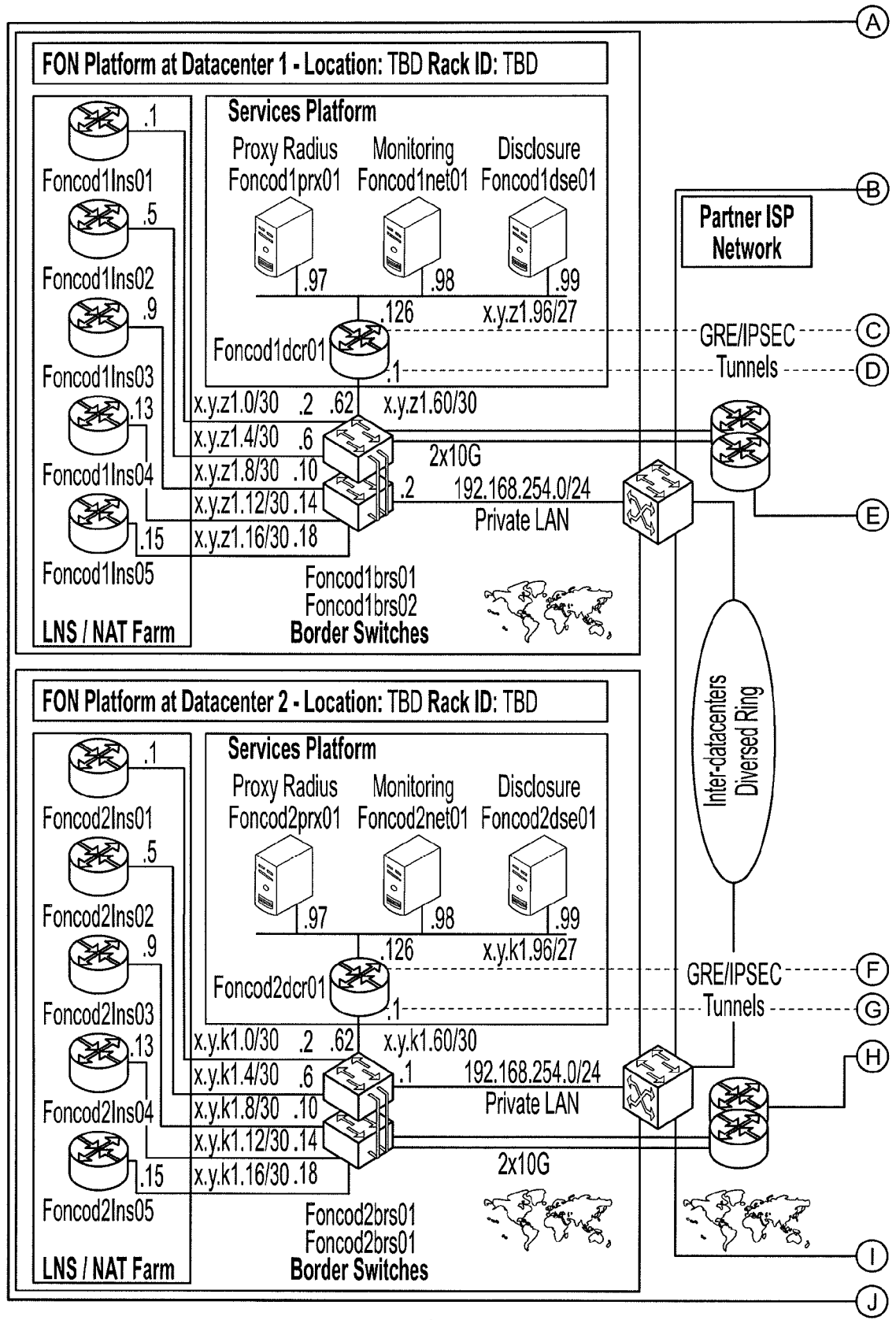
FIG. 5 is an example of a layer 2 live platform map showing link connections between the system platform and the ISP data center according to an aspect of the disclosure.
Figure 5:
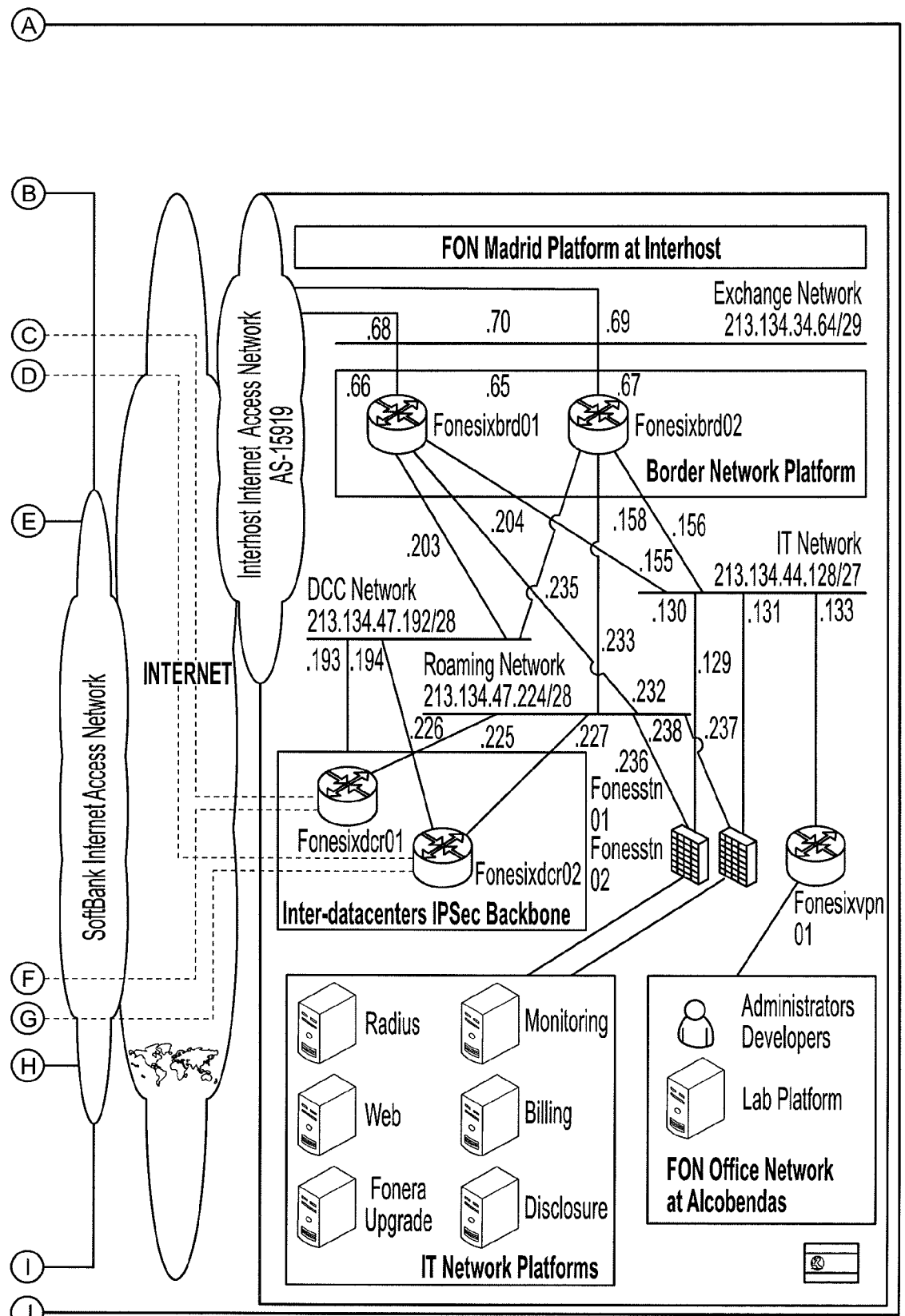
Figure 6:
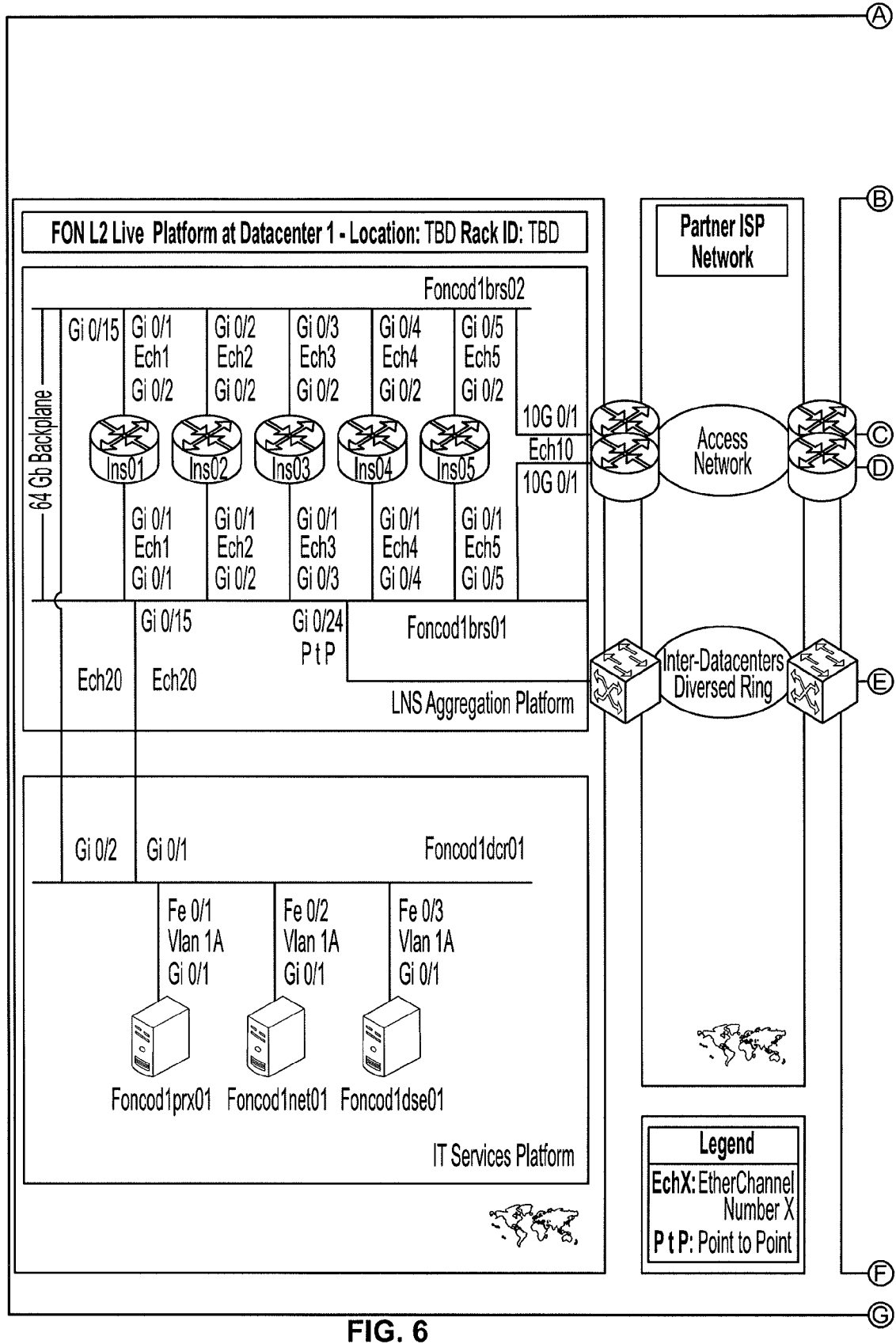
FIG. 6 illustrates an example of structures of data center modules of the system according to an aspect of the disclosure.
Figure 6:
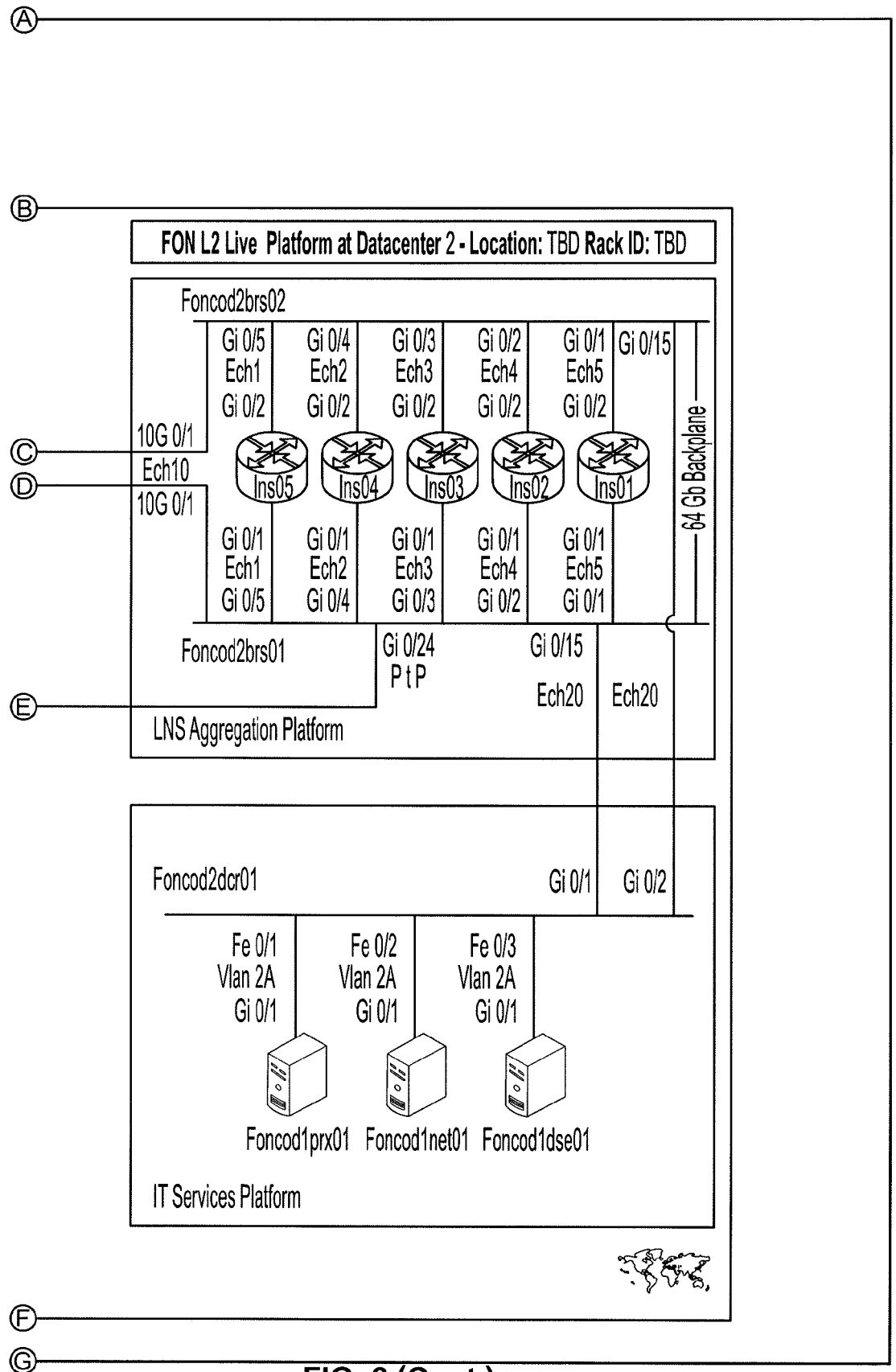
Figure 7:
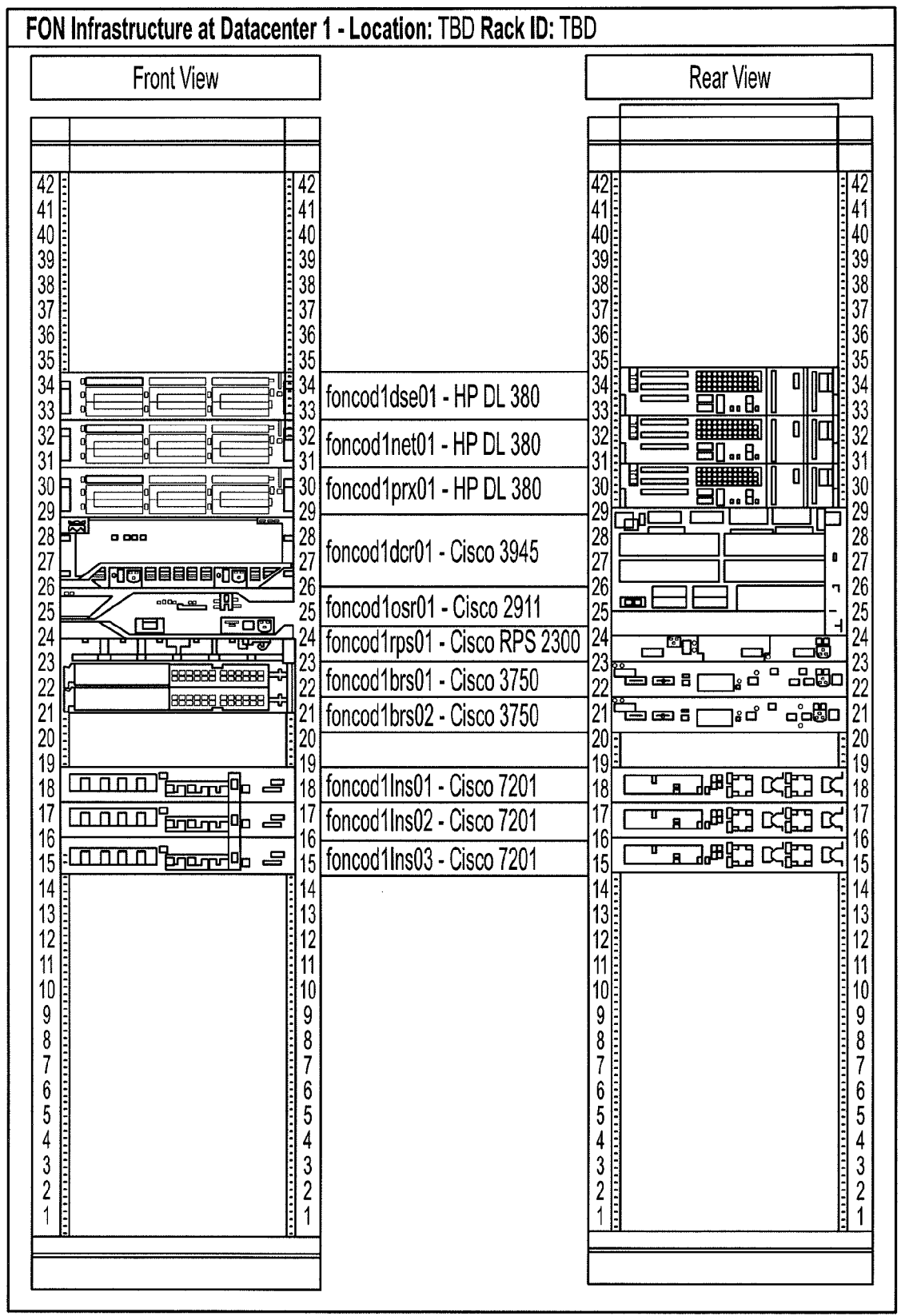
FIG. 7 illustrates an example of the equipment distribution within racks at two data centers according to an aspect of the disclosure.
Figure 7:
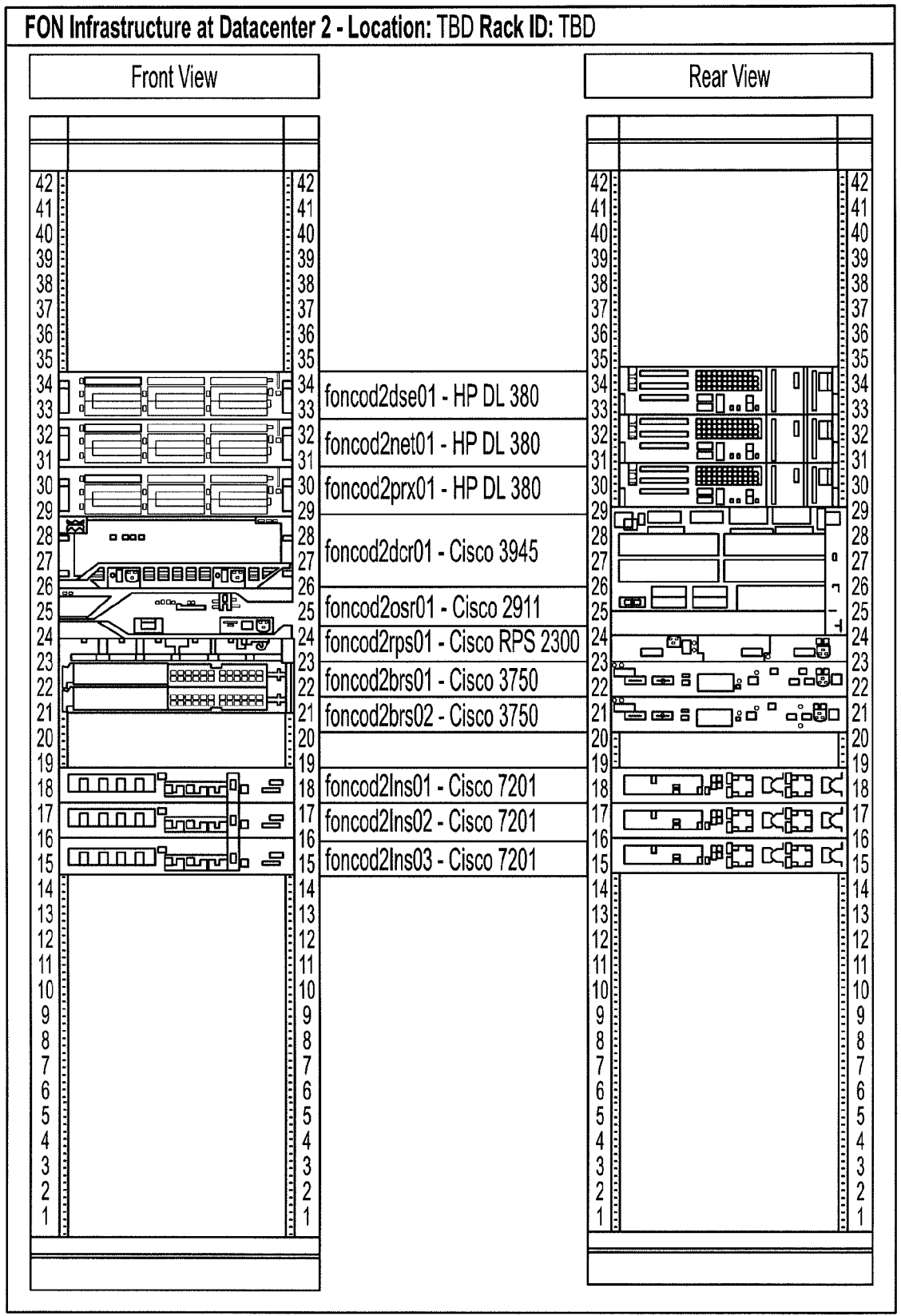
Figure 8:
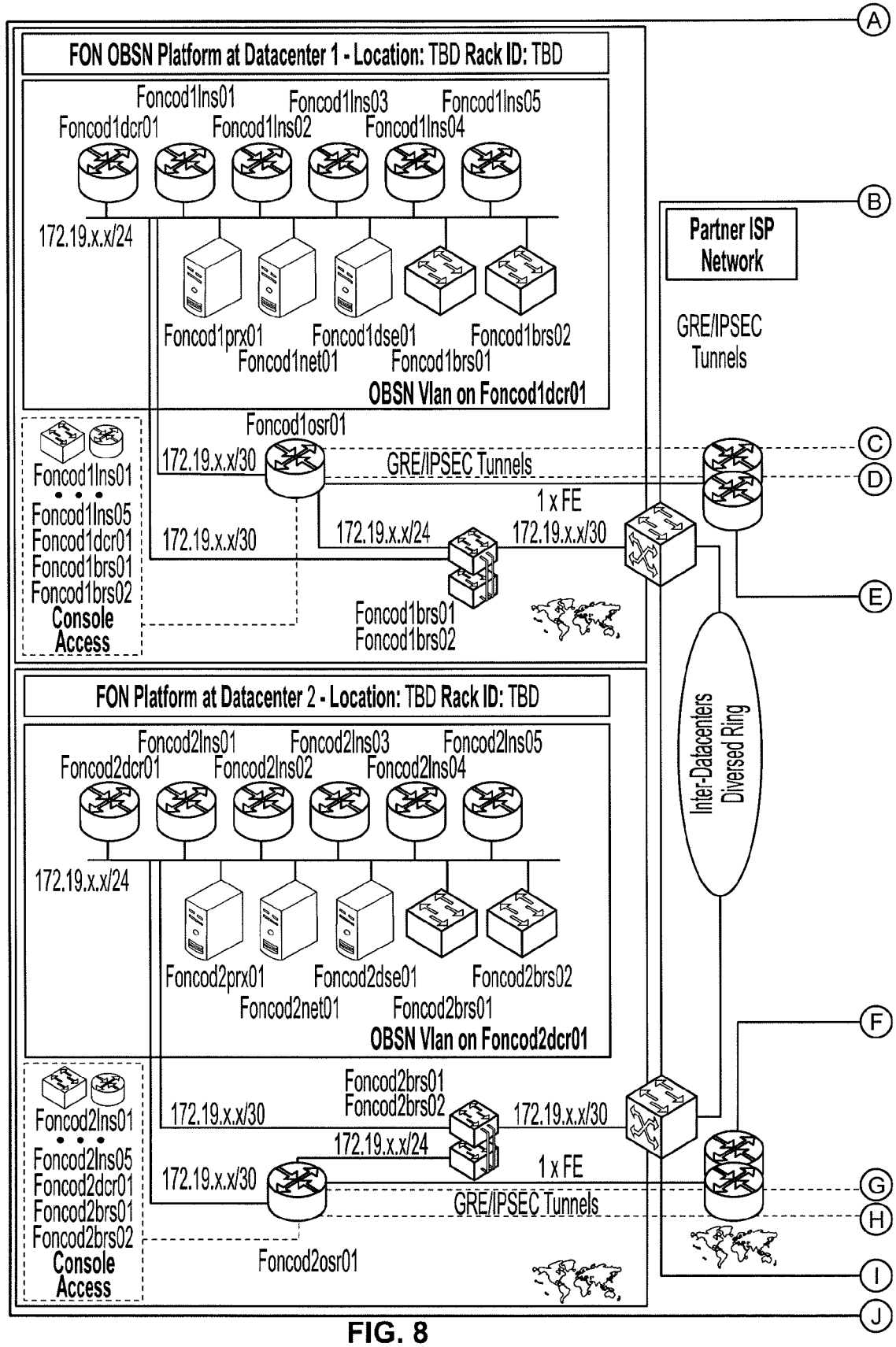
FIG. 8 illustrates an example of IP connections for out of band supervision network in the ISP data center and a central data center according to an aspect of the disclosure.
Figure 8:
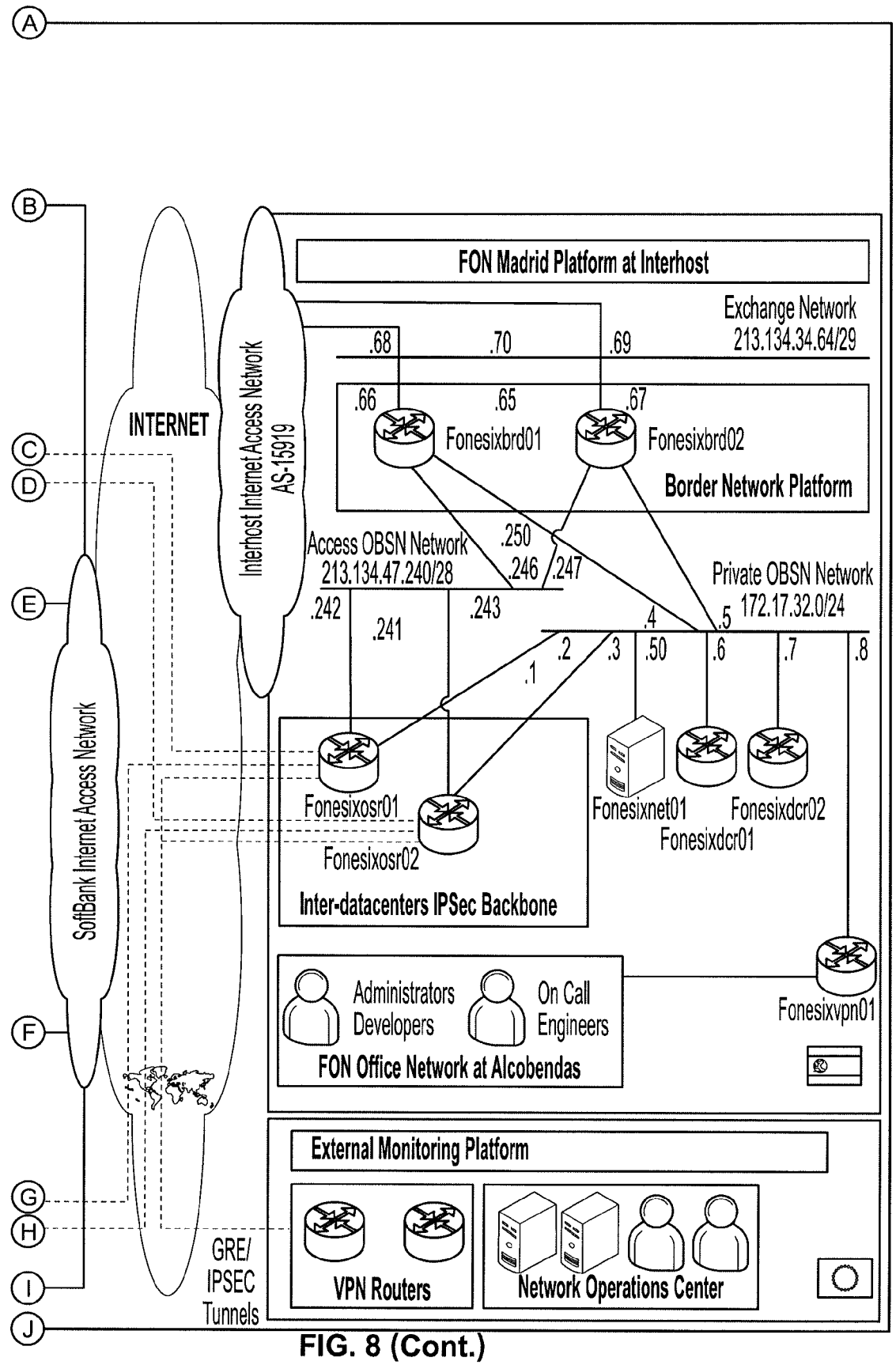
Figure 9:
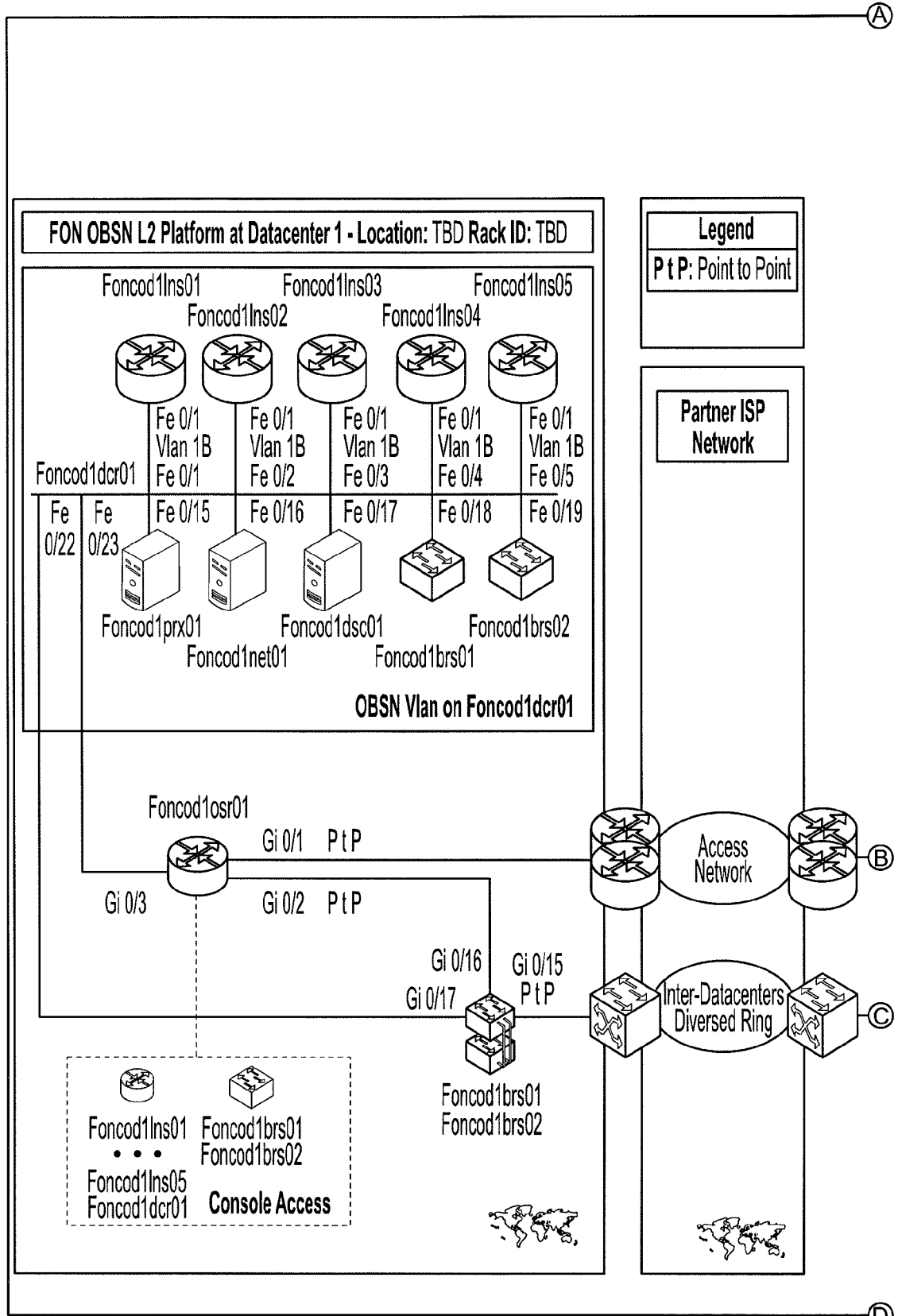
FIG. 9 is an example of a layer 2 OBSN platform map representing an example of link connections at the system's out of band supervision network platform at an ISP and interconnections with the ISP platform, according to an aspect of the disclosure.
Figure 9:
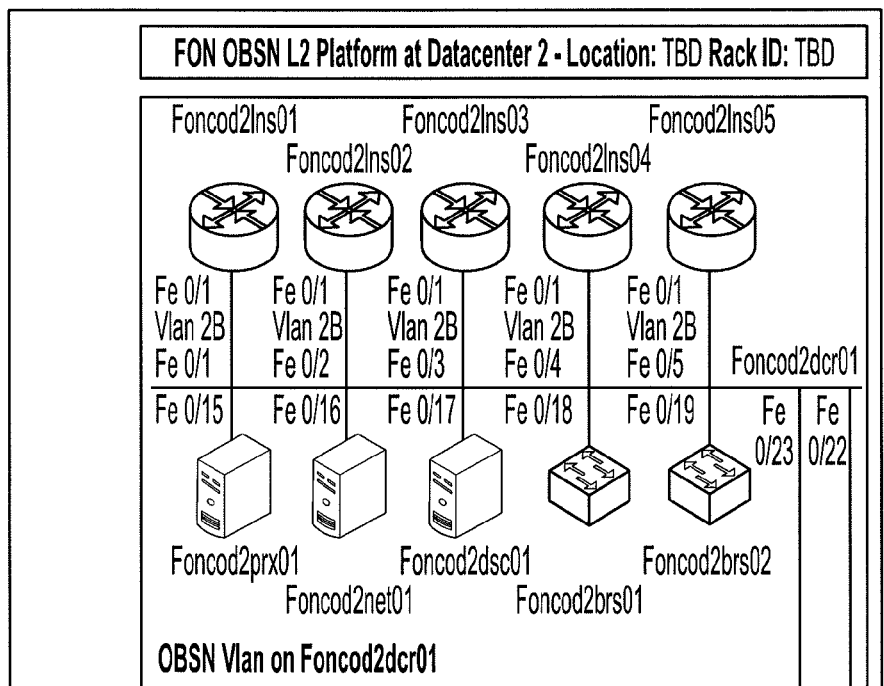
Figure 9:
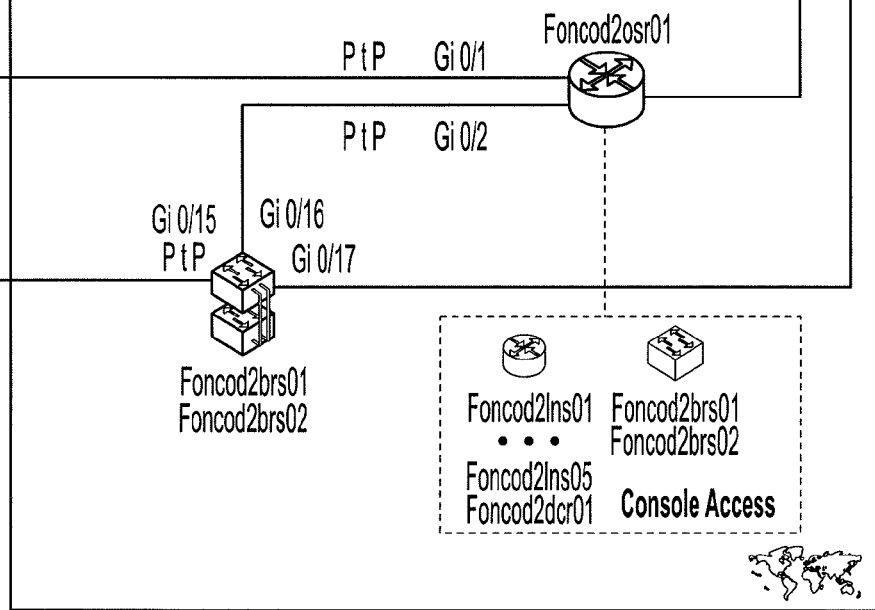

FIG. 5 illustrates a layer 2 live platform map. FIG. 5 illustrates link connections between system equipment at the ISP data center and other ISP data centers and the central data center supporting the identification and secure tunneling services. FIG. 6 is a layer 2 live network map showing the relationship between equipment at data center 1 and data center 2 connected via ISP data network.

LNS sub-platform, could provide functions such as terminating the L2TP and PPP tunnels originate at the configured router 22, as earlier mentioned, and in addition the LNS sub-platform can assign a private address for the user's sessions, translate the private IP address into public IP addresses, generate NAT accounting and forward such NAT results to an external system log, authenticate the user's sessions using, for example, a RADIUS protocol, and can generate sessions accounting using the RADIUS protocol.

At the same time, an IT service's sub-platform can provide a router/firewall to provide encrypted tunnels (Gre/IPSec) with the central data center for secured RADIUS authentication and other transactions, and can implement firewall capabilities so as to protect the servers installed at the data centers. The IT service's sub-platform can also provide the RADIUS proxy server that concentrates a radius authentication and accounting and forwards the results to the system RADIUS proxy at the central data center. In addition, the IT service's sub-platform can work as monitoring server to check the health status of the network and server devices and can forward the information to the centralized monitor platform at the central data center. In addition, it can act as a disclosure server to store the information required for disclosure action, including the RADIUS logs, NAT accounting, and the like. It can also provide a secured web interface for data extraction. Finally, a border switches can aggregate traffic from the LNS and IT service's sub-platform, provide IP connectivity with the ISP data center and a platform of the ISP as a whole, and provide inter-data center connectivity so as to provide redundancy.

Scalability of the live platform can be provided as follows. The LNS sub-platform can have a number of LNS routers so that tunnel sessions and NAT services are distributed among all the LNS routers. Thus, network traffic congestion and single points of network failure can be avoided thus allowing scaling by addition of LNS routers. IT services can be provided by a server farm, such as an HP DL 380, for multiple purposes, including monitoring, RADIUS proxy and disclosure services that can grow by adding additional servers. The IT services router can include a modular router (for example, CISCO 3945), that can either be upgraded with additional hardware or with a secondary router. Border switches can include core switches, for example CISCO 3750E with stackWISE PLUS technology that permits aggregating up to nine switches with 64 gigabytes backbone. Redundancy can be provided by the LNS sub-platform because each LNS is independent of the others and can be spread over two or more geographically separated data centers, as illustrated in FIG. 1. The configured router 22 can dynamically configure the primary LNS 31 at the ISP as well as a secondary LNS at a second data center. Thus in the event that one or more LNS servers fail, the user is reconnected to a secondary or tertiary LNS.

Redundancy is also provided by LNS fail over, according to which LNS platforms can be dimensioned with extra capacity to ensure service even when maximum usage scenario in the event multiple LNS fail. An IT services router and servers are duplicated in data centers so that all LNS routers can reach both IT services platforms locally or through the inter-data center link, for example if the RADIUS proxy fails, the LNS routers can connect to the secondary RADIUS proxy. Similarly, the border switches are configured in a cluster in each data center so that in the event that the master switch fails in one data center, a slave switch or more than one slave switch at the same data center becomes the master without service interruption. In this way, all LNS routers and the IP services router have redundant connections to the master and slave switches.

Typically, two data centers are required that are geographically redundant and remote from one another, as illustrated in FIG. 1. However, it would be understood that a single data center or two or more data centers located close by will also be sufficient to perform and implement the invention here described. Typically, a switched PDU will have rack power bar that can perform remote power on/off the network operation center will be supported to respond to possible issues, for example, for instance the system may need to report a power outage and appropriate action may be required. Engineers equipped for the task should be available in case urgent physical action is necessary, for example, in a case of power outage or in case a wire is not properly connected to one or more structures or devices or equipment as described herein. The communication for the live network could typically require 2×10 Gbps Internet links for user traffic on each data center (for a total of 4×10 Gbps total). The interface type for example LR or SR or the like could typically be provided and each link can be connected to a different router for redundancy purposes.

Out of band supervision for the network can be provided as 1× fast internet link for remote management purposes (2×100 Mbps) and these links could be connected to different routers than the others for the live network connections for redundancy purposes. An internet-data center private network can include 1× fast Ethernet private link between both racks located at each data center. This may be thought of as a critical link so that diverse protection can be implemented for multiple paths (again for redundancy purposes). If diverse protection is unfeasible, a second link can be implemented.

Out of band supervision for the network (OBSN) can include secured and reliable remote administration capabilities, including an IPSec tunnels established from the OBSN router's central data centers to the system OBSN routers at the ISP data center, The connection from the data center at the central data center to the equipment at the ISP data centers can be fully encrypted and the traffic for the OBSN is separate from the user's traffic with virtual routing forwarding (VRF) for instance. Access to each piece of equipment can be secured remotely by SSH or by Console to assure that the equipment is available and reachable even when there is a connectivity problem or requires remote access to implement a boot sequence.

The OBSN network is located at the DCR routers which have a 24 port Fast Ethernet card with VLAN configuration capabilities. Each piece of equipment (routers, servers, PDU, etc) is connected to this network for remote administration purposes.

Whether the equipment has VRF (virtual routing forwarding) capabilities, it should be configured in order to guarantee the OBSN isolation from other networks. If the equipment lacks this capability it is either connected only to the OBSN network or configured with the strictest level of security to avoid the OBSN being compromised.

OSR routers may reach the local OBSN Vlan at the DCR, reach the other datacenter OBSN Vlan through the Border Switches, reach the Madrid platform through the IPSec/GRE tunnels.

DCR routers can have OBSN Vlan directly connected, and routes to reach the other datacenter OBSN Vlan through the Border Switches may be provided. Its default route can be the local OSR.

Border Switches can have routes to reach the local OBSN Vlan at the DCR, routes to reach the other datacenter OBSN Vlan through the point to point link, and a default route with the local OSR.

A Configured router's firmware can be modified to connect to this platform and check that the L2TP over PPP tunnel is not filtered with different ISPs at the country where the ISP is located.

An OpenNMS platform can be deployed to monitor the network equipment using the SNMP protocol.

A Zabbix platform can be deployed to monitor the servers and services (RADIUS proxy, etc) by using local agents.

Secondary monitoring platform can be configured on the central data center platform in order to check that the primary monitoring platform at the partner's datacenter is working properly; the communications between SYSTEM platform at the partner's datacenter and Madrid works properly; and alerts are escalated by email/SMS to the SYSTEM administrators Blackberry devices.

Remote monitoring platform can use the OBSN to reach the SYSTEM equipment at the partner's datacenter.

Mobile client applications can be provided on iOS and android devices, as well as other types of phones and handheld and portable devices. An Apache web server may be used running on LINUX. However, it will be understood that other systems may also be used.

The present methods, functions, systems, computer-readable medium product, or the like may be implemented using hardware, software, firmware or a combination of the foregoing, and may be implemented in one or more computer systems or other processing systems, such that no human operation may be necessary. That is, the methods and functions can be performed entirely automatically through machine operations, but need not be entirely performed by machines. Similarly, the systems and computer-readable media may be implemented entirely automatically through machine operations but need not be so. A computer system may include one or more processors in one or more units for performing the system according to the present disclosure and these computers or processors may be located in a cloud or may be provided in a local enterprise setting or off premises at a third party contractor. Similarly, the information stored may be stored in a cloud or may be stored locally or remotely. The computer system or systems for interacting with a user can include a GUI (Graphical User Interface), or may include graphics, text and other types of information, and may interface with the user via desktop, laptop computer or via other types of processors, including handheld devices, telephones, mobile telephones, smart phones or other types of electronic communication devices and systems. A computer system for implementing the foregoing methods, functions, systems and computer-readable storage medium may include a memory, preferably a random access memory, and may include a secondary memory. Thus, although illustrated as a system database, the database may be part of the same machine or may be located off site, and may be implemented as a floppy disk drive, magnetic tape drive, an optical disk drive, removable storage drive, a combination of the foregoing or any type of recording medium. Examples of a memory or a computer-readable storage medium product include a removable memory chip, such as an erasable programmable read-only memory (EPROM), a programmable read-only memory (PROM), removable storage unit or the like.

The communication interface may include a wired or wireless interface communicating over TCP/IP paradigm or other types of protocols, and may communicate via a wire, cable, fire optics, a telephone line, a cellular link, a radio frequency link, such as WI-FI or Bluetooth, a LAN, a WAN, VPN, the world wide web or other such communication channels and networks, or via a combination of the foregoing.

According to an aspect of the disclosure, public IP addresses are conserved in order to reduce the number of public IP addresses that are necessary for the system. Thus, when there is no incoming communication from the internet to user device 21 and there is no direct communication between users of the ISP, an IP conservation solution could be provided. A distributed NAT with an each LNS 31 could thus be implemented. Accordingly, performance could be improved since all user traffic passing through the NAT (for example within 7200 CISCO ROUTER) and the NAT accounting has to be generated by the NAT router. There may be no scalability limit as practical matter since the NAT is distributed and each LNS is totally independent of other LNSs. Reliability can also be enhanced since no extra points of failure are introduced since the system relies on existing network equipment.

An example of an IP addressing approach for the live platform or for other communication scenarios is described below. PPP sessions can be assigned a private IP address in the range 10.128.0.0/9. A private/18 pool can be assigned to each LNS for the user's PPP tunnels. Each LNS has a public/26 pool to NAT the PPP sessions. The public IP addresses are also required for platform configuration. In this way, a total of perhaps a public/22 network is required for each data center, for the NAT pools, platform configurations and for future service growth. IP addressing for the OBSN platform can be implemented, for example, by configuring private IP addresses at the OBSN platform to achieve enhanced security and IP conservation. The only public IP address at the OBSN platform could be configured, according to this implementation, at the OSR routers connected to the internet through the ISP data center. In this way, public IP addresses can be conserved to some degree.

A significantly scalable solution can be provided if the tunnel and NAT solution provided by the LNS router is in the distributed model. Two border switches can be included for each data center so as to aggregate at least 14 LNS routers. Each LNS router can support, for example 10,000 user sessions, and each have 1.8 Gbps of throughput and 2 Gbps of memory RAM so that a peak concurrency for each user can be 100 Kbps of throughput and 100 NAT translations on average. Depending on the service performance, additional equipment may be necessary for the NAT log storage.

In accordance with an embodiment, three actors, namely a supplicant, an authenticator and a server are used and employ tunneling or may not employ tunneling. FIG. 14 illustrates a supplicant, an authenticator and an authentication server. In one embodiment, for example, EAP ("Extensible Authentication Protocol") messages are transferred from EAPOL to PPP and then to RADIUS. In an alternative embodiment, a tunneling "on demand" architecture is employed, which eliminates a step of converting EAPOL to PPP, and that may be easier for manufacturers to implement. In the alternative embodiment, a proxy RADIUS (that may be modified to trigger the PPP authentication) is employed, or a modified EAP daemon may be applied. Each of these two embodiments are discussed in greater detail below, in connection with FIGS. 11, 12 and 13.

In an embodiment, the present application employs regards the extensible authentication protocol ("EAP"), an authentication framework that is frequently used in wireless networks and Point-to-Point connections. EAP is widely used, for example, in IEEE 802.11 (Wi-Fi), and WPA and WPA2 standards have adopted IEEE 802.1x with multiple EAP types for authentication mechanisms. When used as an authentication protocol, EAP is usable on the captive portal, and is suitable when used with WPA and/or WPA2. For example, LEAP (Lightweight-EAP), EAP-TLS, EAP-TTLS, EAP-FAST, EAP-SIM, EAP-AKA are applicable in association with one or more credentials and/or processes. In an embodiment, 802.1x involves a supplicant (e.g., a mobile computing device such as a smartphone, PDA or the like), an authenticator (e.g., a configured router) and a server. 802.1x is used to transport EAP messages via EAP over Lan ("EAPOL") from a supplicant to an authenticator, and thereafter via RADIUS/Diameter from authenticator to the server.

In such embodiment(s), a universal access method ("UAM") is used to transport password authentication protocol ("PAP") messages. Thereafter, HTTPs may be used for transporting data from supplicant to a UAM Server, HTTP is used from supplicant to authenticator, and RADIUS is used from Authenticator to Server.

Figure 11:
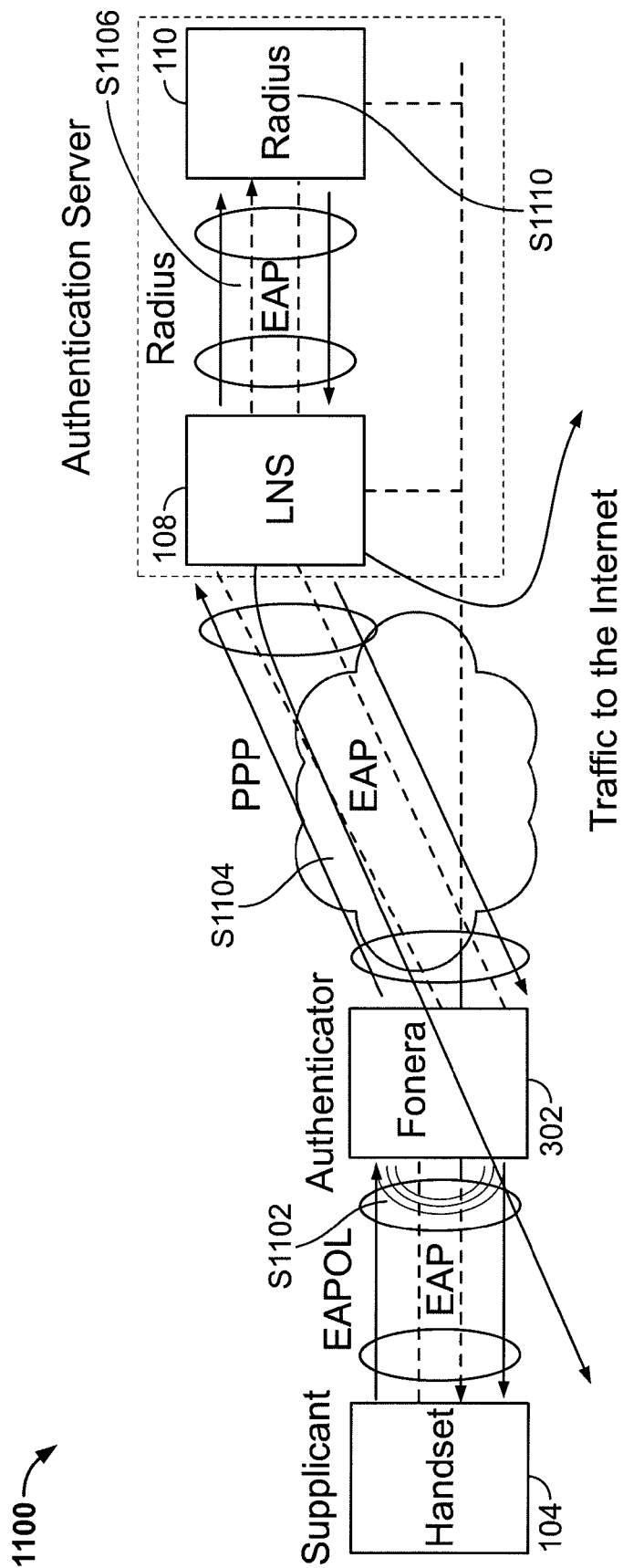
FIG. 11 is a schematic illustration of an illustrative example of an EAP with tunneling approach, according to an aspect of the disclosure.
Figure 12:
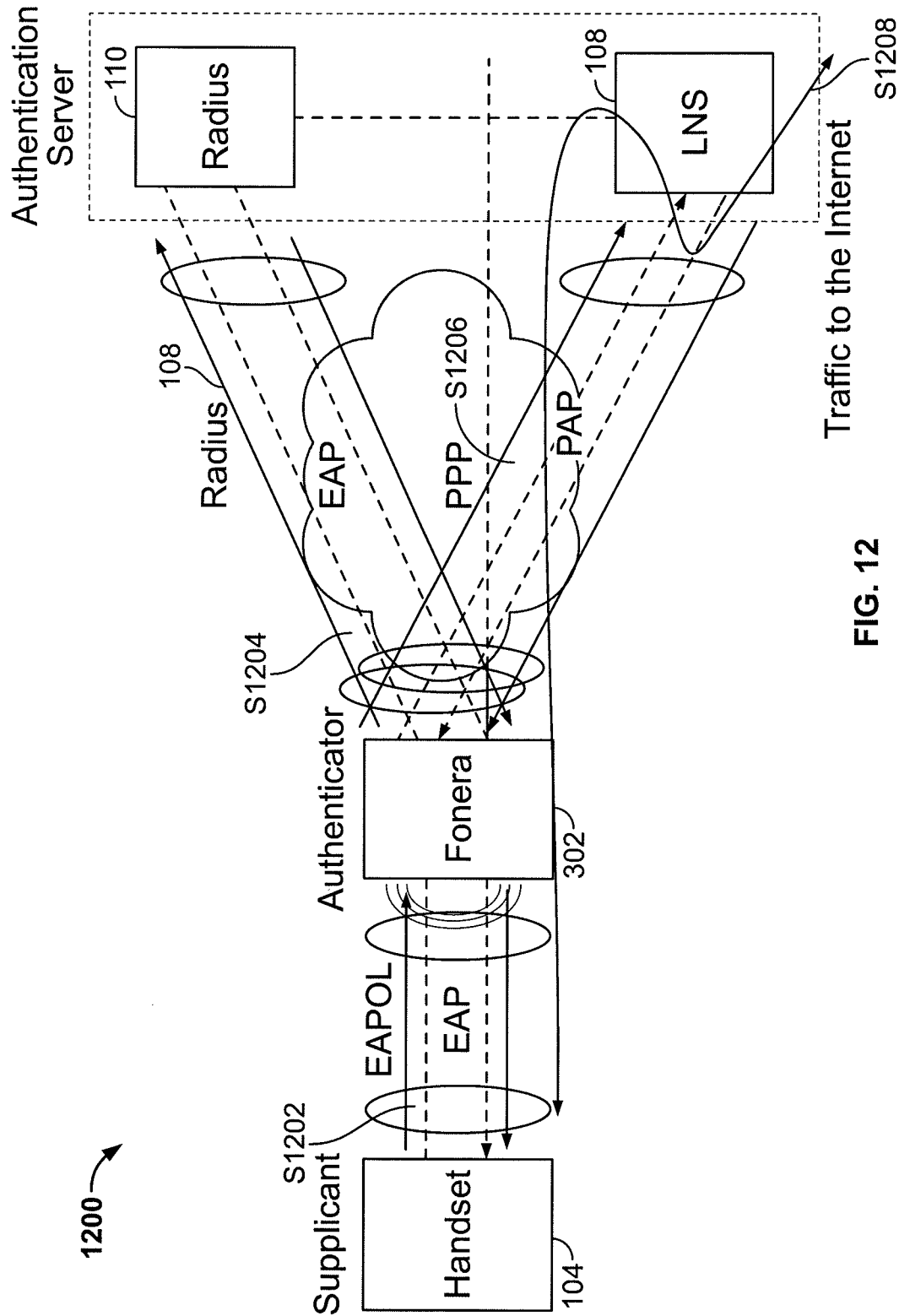
FIG. 12 is a schematic illustration of another example of an EAP with tunneling approach, including tunneling on demand, according to an aspect of the disclosure.
Figure 13:
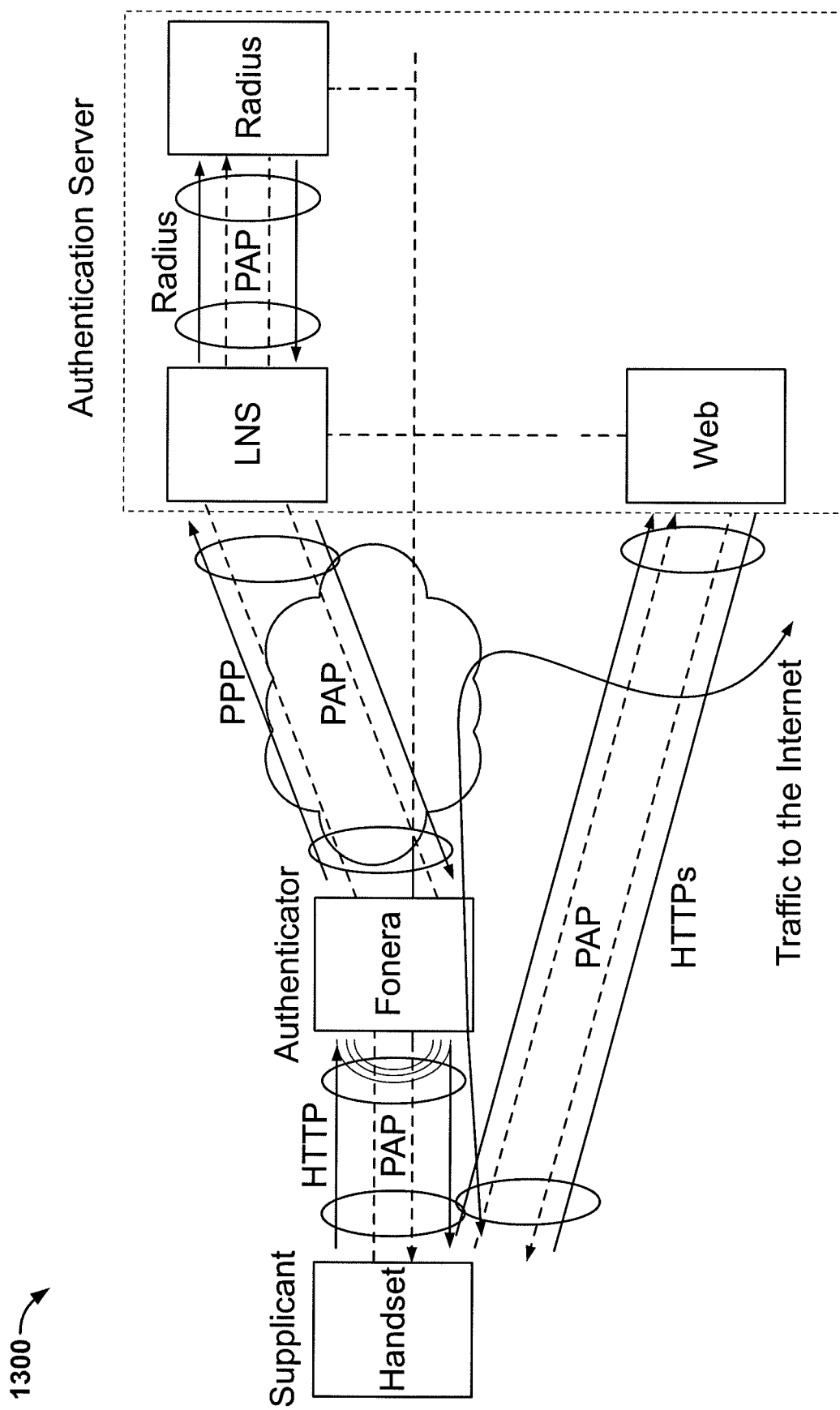
FIG. 13 is a schematic illustration of an illustrative example of a tunneling approach in which the server consists of three elements, according to an aspect of the present disclosure.
Figure 14:
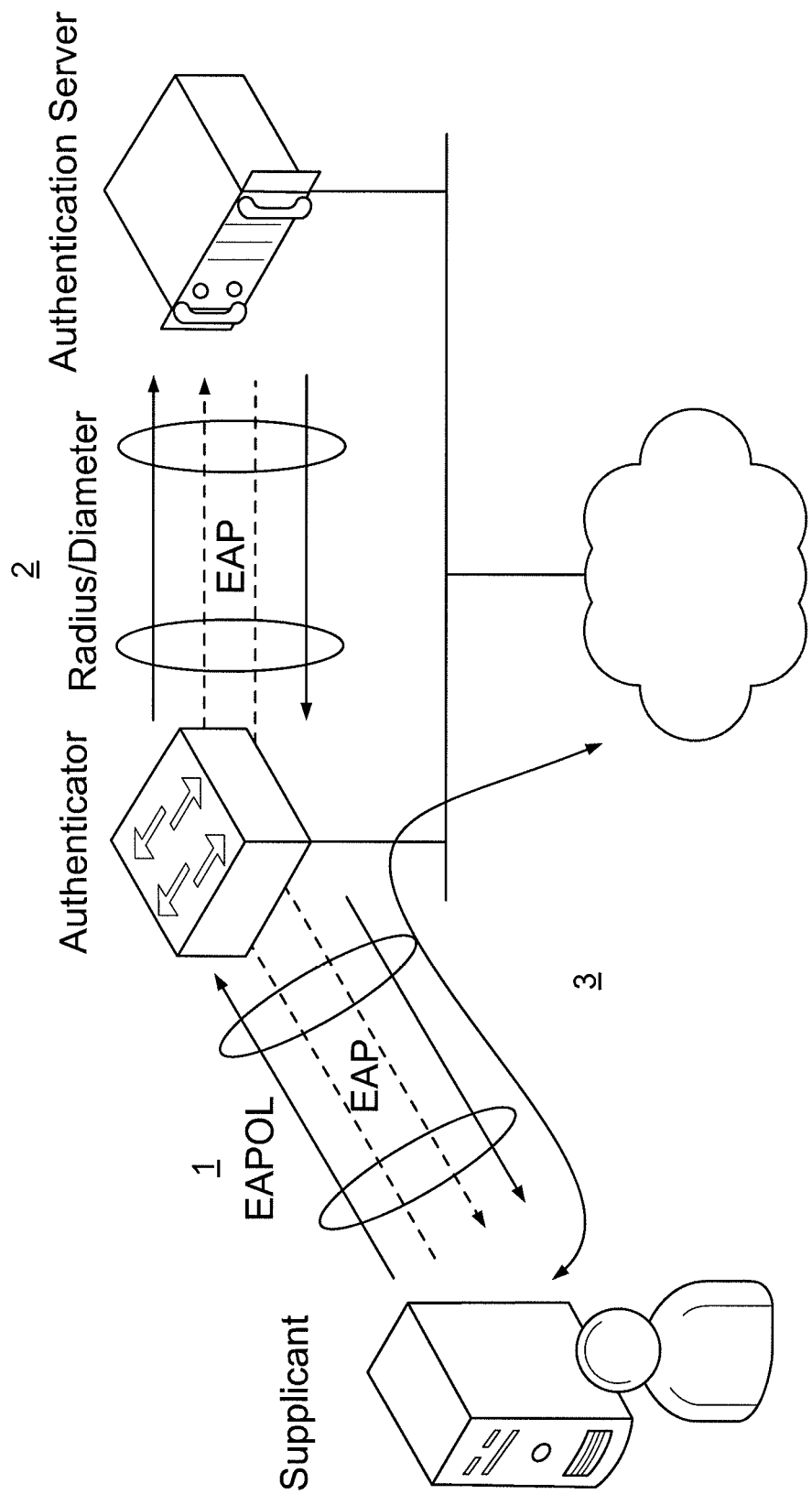
FIG. 14 is an example of the Supplicant, Authenticator and Server model using EAP messaging and EAPOL communication from Supplicant to Authenticator.

FIGS. 11-13 illustrate by way of illustrative example embodiments according to an aspect of the present disclosure. As noted above, EAP may be used for transmitting credentials, such as for user authentication. In known systems, however, EAP is not usable transmitting credential information from a mobile computing device, such as a smartphone, to an authenticating server, such as RADIUS server 110.

While described herein with respect to specific types of equipment, specific bandwidth requirements and specific network solutions and protocols, it will be understood that other types of equipment, bandwidth limitations and approaches in protocols are also contemplated and would also serve perfectly well to accomplish and implement the invention as herein described.

In an embodiment, data are encapsulated in one format and transmitted from one device, such as computing device 104 that is a smartphone, and then transmitted to another device that removes the EAP capsule, and encapsulates the authentication information using another protocol, for example, PPP, and transmit that to another device, for example RADIUS server 110. Once RADIUS server 110 receives the PPP encapsulated credentials, RADIUS server 110 authenticates the user using the authentication credentials (or does not authenticate due to improper credentials or other reason), RADIUS server 110 transmits a reply via PPP. The reply via PPP is received, opened and encapsulated back into EAP, before being transmitted back to computing device 104.

FIG. 11 illustrates an example hardware arrangement 1100, in addition to data transmissions and respective communication protocols employed therewith. As shown in FIG. 11, authentication happens in one phase. The user using handset 104 tries to associate using 802.1x (EAPOL) and sends EAP messages encapsulated in this protocol (step S1102). Configured router 302 transforms the EAP messages from EAPOL to PPP and sends them to the LNS (step S1104). LNS server 108 transforms the EAP messages from its PPP capsule to a RADIUS capsule and forwards them to the RADIUS server 110 (step S1106).

Thus, and as illustrated in FIG. 11, configured router 302 receives credential information in the EAPOL capsule, removes the EAPOL capsule and encapsulates the credential information into PPP and transmits it to LNS server 108. LNS server 108 receives the PPP packet and forwards the EAP credential information via the RADIUS protocol to RADIUS server 110. The successful authentication implies that a PPP/L2TP tunnel has been established between the router 302 and the LNS server 108. The tunnel is specific to the user handset 104 and all the traffic to and from this device will be routed through the tunnel until the session stops.

FIG. 12 illustrates an example hardware arrangement 1200, in addition to data transmissions and respective communication protocols employed therewith. In the example shown in FIG. 12, the tunnel establishment happens in two phases. Phase one regards user authentication. The user tries to associate a signal using 802.1x (EAPOL) and sends EAP messages encapsulated in this protocol (step S1202). Configured router 302 transforms the EAP messages from the EAPOL capsule and puts them in a RADIUS format and sends them directly to the RADIUS server 110 (step S1204). At phase two, in case the user is authenticated, for example by RADIUS server 110, RADIUS server 110 optionally sends back a one time password to configured router 302, which uses it to establish a L2TP/PPP tunnel with the LNS108 which will then be used to route the user's traffic (step S1206).

Thus and in connection with FIG. 12, user device 104 has the user credentials (not shown) and starts an association with the configured router 302 using the 802.1x (EAPOL) protocol. EAP is used to transmit the messages that authenticate the user. The EAP messages may be different, depending on the type of EAP that is used (EAP-SIM, EAP-AKA, EAP-TTLS or other suitable type). Configured router 302 takes the EAP messages encapsulated in the 802.1x (EAPOL) and encapsulates them in a RADIUS packet that is sent to the RADIUS server for user authentication. RADIUS server 110 replies with new EAP messages (as known in the art, this process may occur more than once until the credentials are considered as validated) to LNS server 108 within a RADIUS encapsulation. Along with the accept message, an (optional) one time password may be sent to configured router 302. If RADIUS server 110 has sent the one time password (which may be identified in a parameter), configured router 302 builds a L2TP/PPP packet with the received one time password and establishes a PPP session to LNS server 108 (e.g., via a suitable authentication protocol, be it PAP, CHAP, EAP) (step S1208).

Continuing with reference to FIG. 12, after the RADIUS server 110 accept indication is received or after the PPP is established (as appropriate), configured router 302 forwards the EAP messages from RADIUS server 110 to the client device 104 and allows the association. Thereafter, traffic is forwarded to the Internet, using the tunnel, provided it was established.

Figure 3:
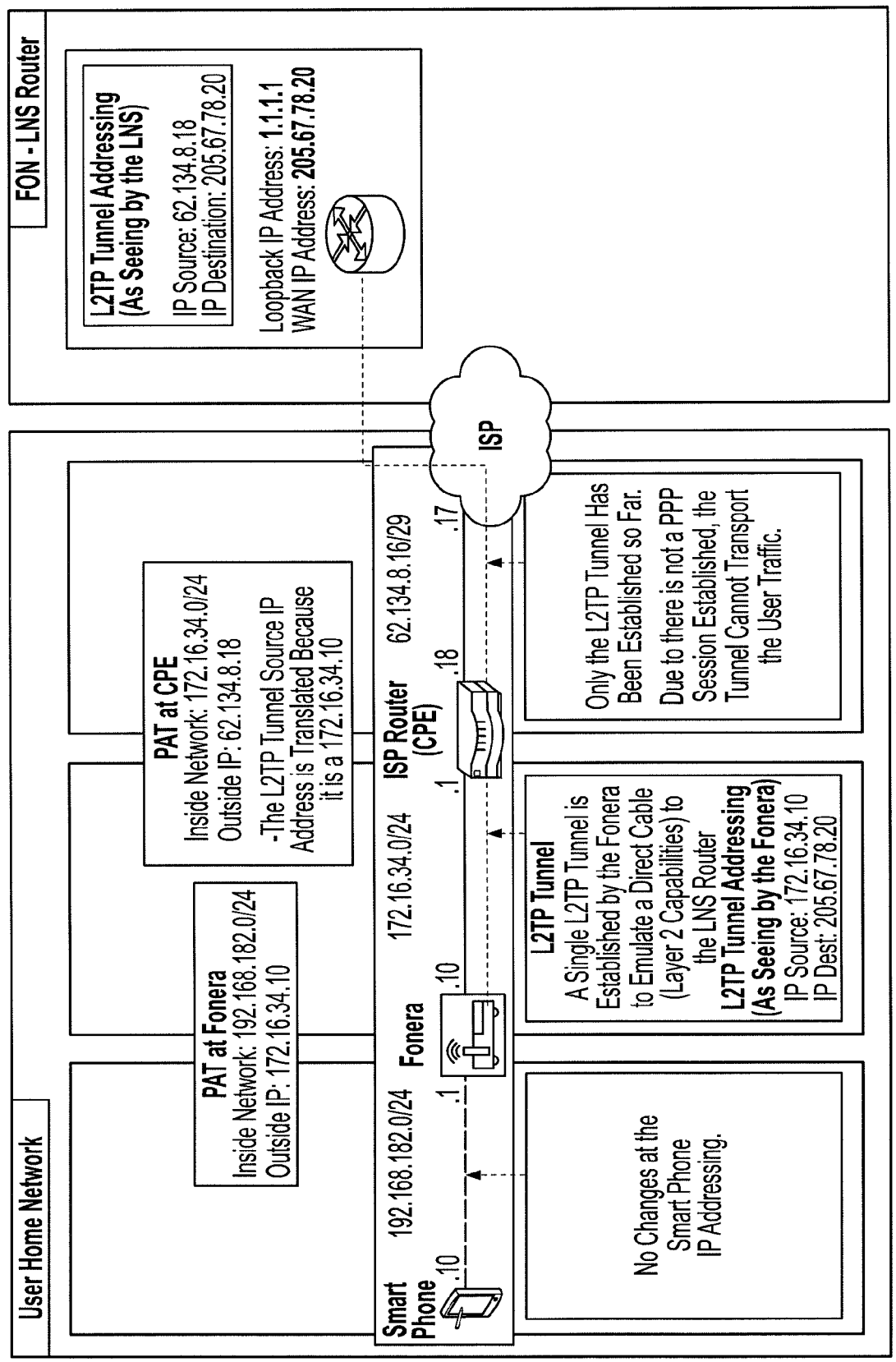
FIG. 3 is an example of a layer 2 tunneling protocol tunnel and a PPP session illustration according to an aspect of the disclosure.

FIG. 13 illustrates an example hardware arrangement 1300, in addition to data transmissions and respective communication protocols employed therewith. The embodiment illustrated in FIG. 13 is a simplified view of that shown and described above, with reference to FIG. 3.

Figure 15:
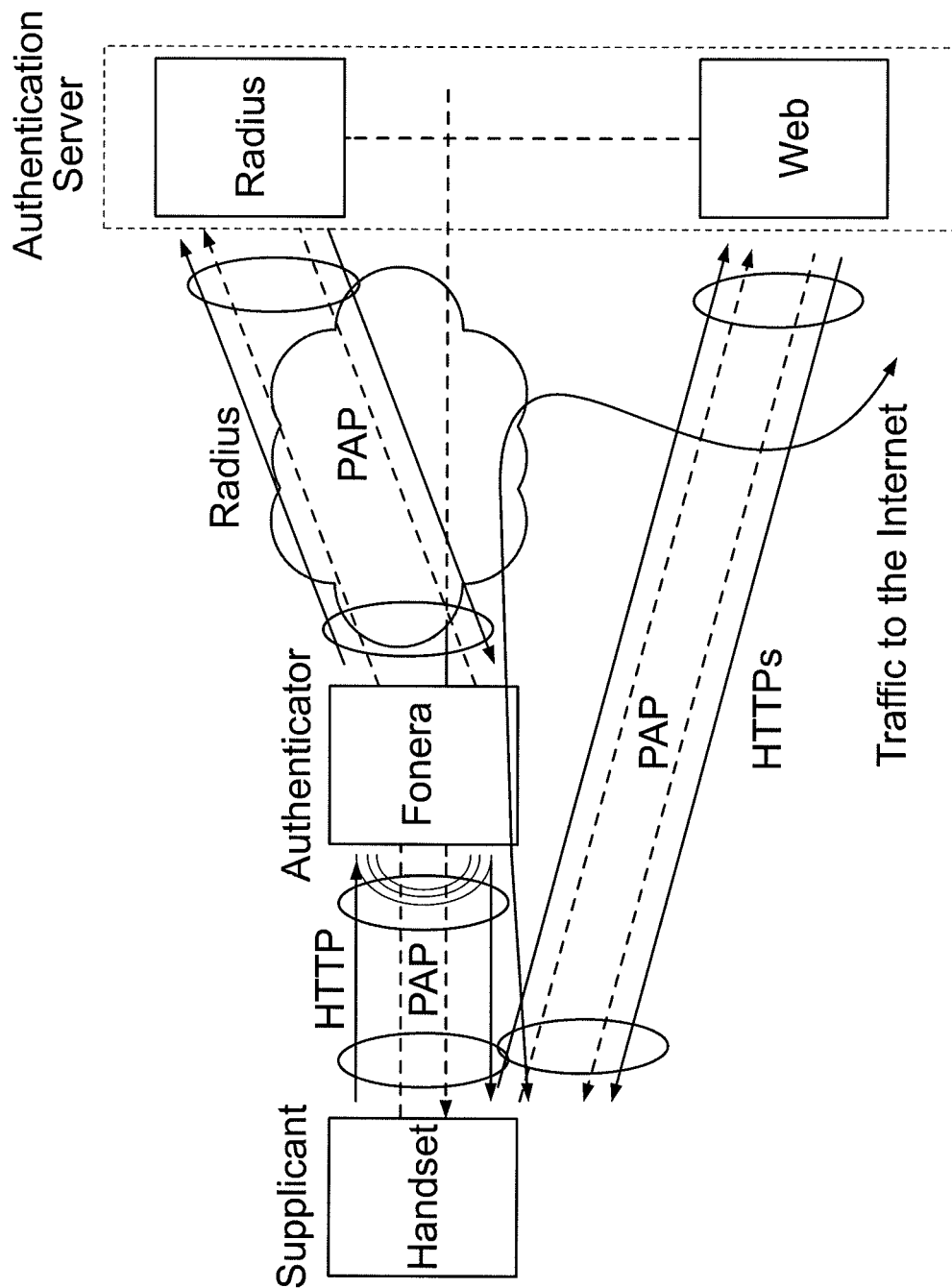
FIG. 15 is a schematic illustration of an example of tunneling in which the server has two elements, and UAM is used to transport PAP messages, according to an aspect of the disclosure.

FIG. 15 illustrates an embodiment of the Supplicant, Authenticator and Server, the Server comprising two elements using a universal access method to transport the PAP messages without the need for tunneling. HTTPs can be used from Supplicant to the UAM server, an HTTP can be used from Supplicant to authenticator, while Radius can be used from authenticator to server.

Figure 16:
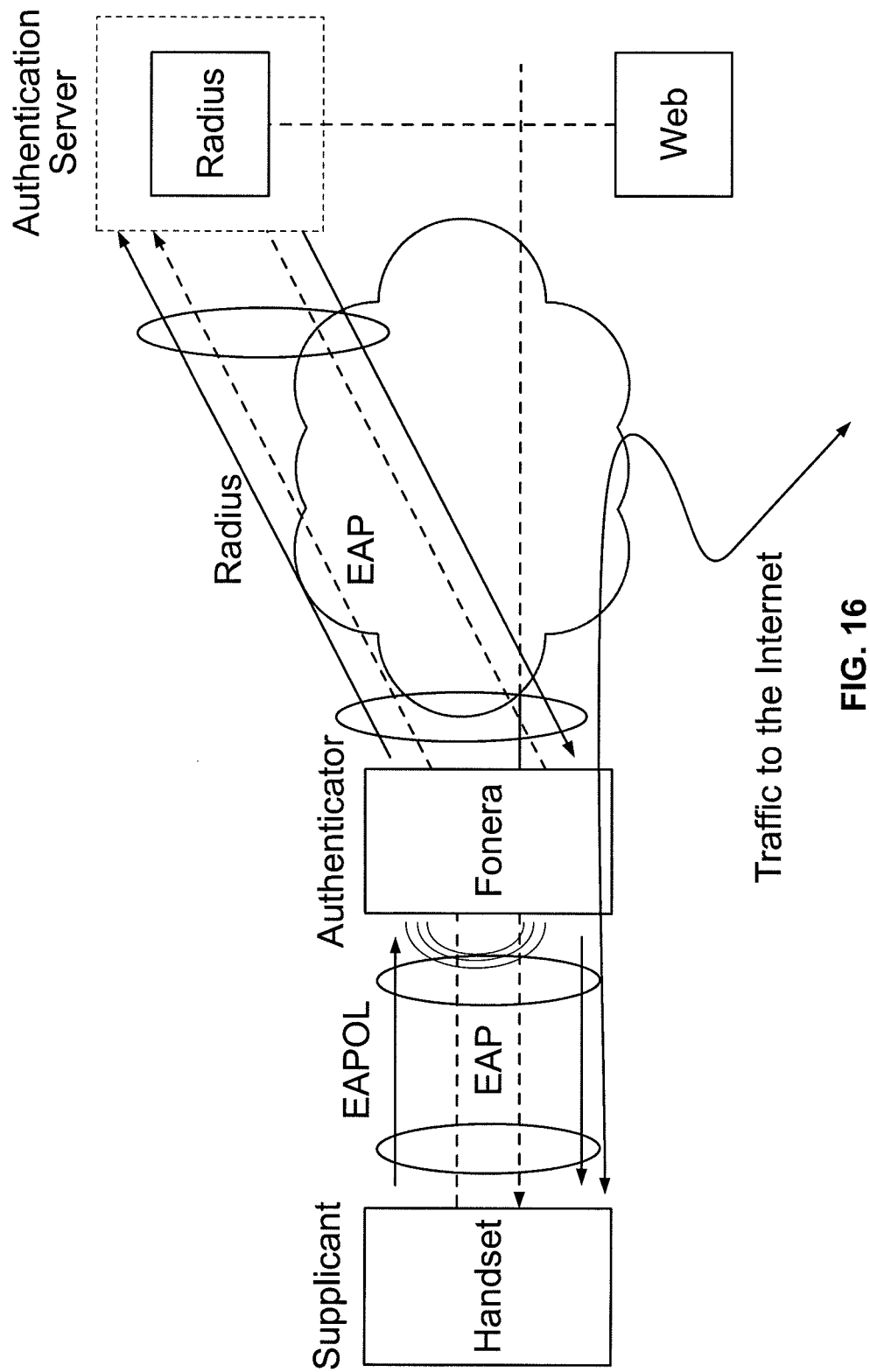
FIG. 16 is a schematic illustration of an example of EAP without tunneling in a server with two elements, according to an aspect of the disclosure.

FIG. 16 illustrates the EAP without tunneling using UAM to transport PAP messages, in which HTTP is used from Supplicant to authenticator, while Radius is used from authenticator to server.

Figure 17:
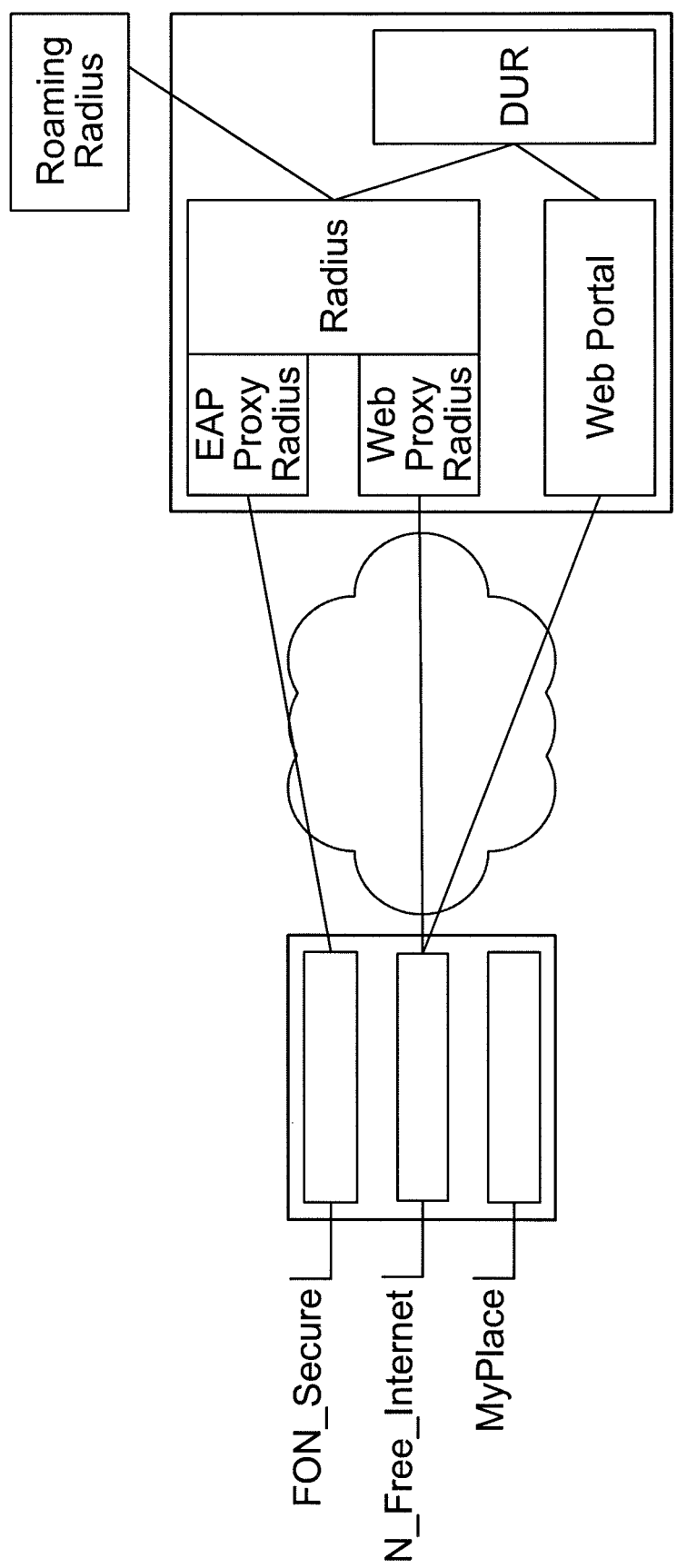
FIG. 17 is a schematic illustration of a user management diagram according to an aspect of the disclosure.

FIG. 17 is a user management diagram.

Figure 18:
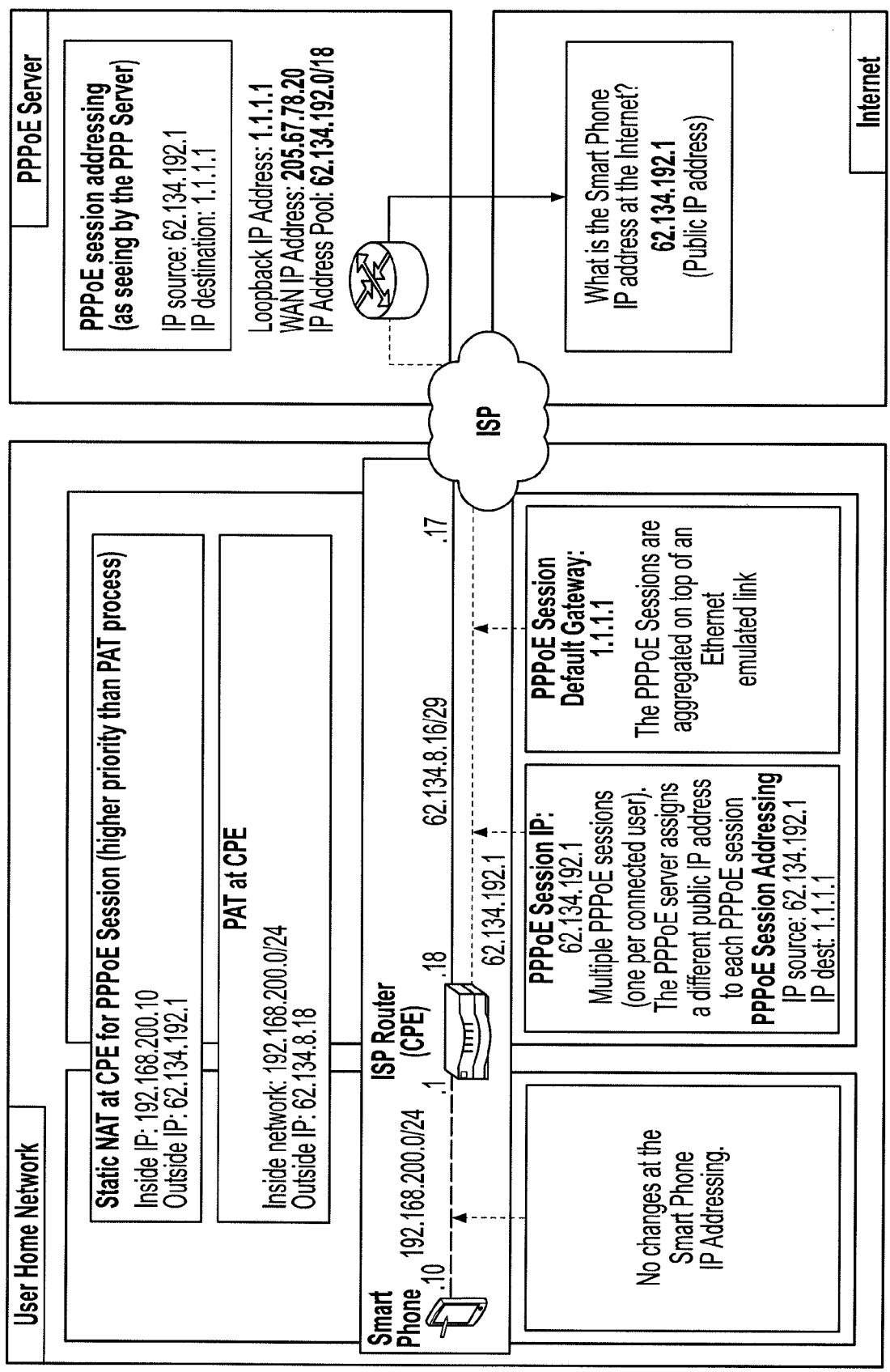
FIG. 18 is a diagram illustrating an example of the system using a PPPoE technology approach according to an aspect of the disclosure.

FIG. 18 illustrates the use of PPPoE technology which may be used instead of the PPP and the L2TP. In addition, a single customer provided piece of equipment from the ISP, for example a CPE device, can be substituted for a combination of a second router device, for example, the Fonera device and the CPE. Using such a PPPoE technology approach, a more efficient and possibly less costly solution can be provided, for example, because of a reduction in a number of pieces of a equipment needed.

GLOSSARY OF TERMS/EQUIPMENT

| Terms/Equipment | Description |
| --- | --- |
| Configured router | SYSTEM supplied wireless router, which provides access to SYSTEM network. |
| LNS (L2TP Network Server) | Network equipment that terminates the tunnels with Configured routers. |
| ISP Router (CPE) | Customer Premises Equipment. Provides broadband access to the Configured router. |
| User traffic tunnel | Provides communication between the Configured router and SYSTEM Platform in Japan. |
| Configured router Autoconfiguration Requests | Communication between the Configured router and SYSTEM Platform in order to let the Configured router get its configuration data (IP address, tunnel parameters, etc.). |
| RADIUS Proxy Servers | Provide the authentication and accounting for users requests, and Configured routers auto configuration requests |
| Monitoring Servers | Responsible of the systems and networks equipment health checks |
| Disclosure Servers | Provides a web interface to securely disclose the relevant user information when it is required by a Legal Enforcement Agency. |
| Web Server Farm | A group of servers that provides multiple SYSTEM webs (user zone, captive portal, FON, etc.) |
| Billing Server Farm | Supports all the billing logical processes, and the authorization users requests |
| UCS Server Farm | Provides the heartbeat between Configured routers and SYSTEM Platform, and upgrade them if necessary |
| NAT/PAT/Overload | Feature that translates an IP address into another. The SYSTEM platform uses PAT to translate private IP addresses into public ones. |
| EAP | Extensible Authentication Protocol, an authentication framework frequently used in wireless networks and point-to-point connections. |
| LEAP | Lightweight EAP. |
| WPA | Wi-Fi Protective Access, a security and certification protocol for Wi-Fi connections. |

While the preferred embodiments of the invention have been illustrated and described, modifications and adaptations, and other combinations or arrangements of the structures and steps described come within the spirit and scope of the application and the claim scope.

What is claimed is:

1. A system for identifying a user and for providing a virtual tunnel over the Internet for communications of the user, the system comprising:
   a tunneling server module configured to receive a user request for authorization to communicate over the virtual tunnel pursuant to a virtual tunneling protocol, and to transmit, based on the user request, an authorization request to an authorization module;

the authorization module configured to receive the authorization request from the tunneling server module, and to transmit to the tunneling server module an authorization accept message for the user only when an authorization determination based on a password contained in the user request determines that the user has been authenticated, wherein the password is transmitted to the user by a remote server module and a transmission indicating the authorization determination is received by the authorization module from a server remote from the authorization module;

the tunneling server module configured to conduct communication with the user via the virtual tunnel only after the tunneling server module receives the authorization accept message for the user, to receive from the user via the virtual tunnel an Internet request, and to forward the Internet request to a destination address contained in the Internet request; and the tunneling server module configured to receive, responsive to the Internet request, over the Internet, a reply, and to transmit the reply to the user.

2. The system of claim 1, wherein the tunneling server module is further configured to assign a public IP address to a user session for the user, wherein the reply is received by the tunneling server module as being addressed to the assigned public IP address; and the tunneling server module is further configured to convert the public IP address to a private IP address of the user before transmitting the reply to the user.

3. The system of claim 2, wherein the tunneling server module assigns the public IP address to the user session according to port address translation and requests the private IP address and a port.

4. The system of claim 1, wherein the virtual tunnel is a layer 2 tunneling protocol tunnel.

5. The system of claim 1, wherein a point-to-point data link protocol session is established for the virtual tunnel.

6. The system of claim 1, wherein the tunneling server module is a layer 2 tunneling protocol network server and the authorization module is a proxy RADIUS server distinct from the layer 2 tunneling protocol network server.

7. The system of claim 1, wherein the tunneling server module is a layer 2 tunneling protocol network server, the authorization module is a proxy RADIUS server, and both the proxy RADIUS server and the tunneling server module are at a data center of an internet service provider.

8. The system of claim 7, wherein the server remote from the authorization module is at a central data center remote from the data center of the internet service provider.

9. The system of claim 8, wherein the central data center and the data center of the internet service provider communicate via dynamic context routers.

10. The system of claim 8, further comprising a proxy RADIUS server at the central data center and configured to make the authorization determination based on the password.

11. The system of claim 8, wherein the remote server module is located at the central data center.

12. The system of claim 1, wherein the system provides a live platform for real time communication between the user and a remote destination via the Internet.

13. A method of identifying a user and providing a virtual tunnel for communication of the user over the Internet, the method comprising:

receiving, by a tunneling server module, a user request for authorization to communicate over the virtual tunnel pursuant to a virtual tunneling protocol;

transmitting by the tunneling server module, based on the user request, an authorization request to an authorization module;

foreseeing by the authorization module, the authorization request from the tunneling server module, and transmitting to a remote authorization server a request for an authorization determination based on a password contained in the user request, the password having been received by the user from a remote user information server;

receiving, by the authorization module, an authorization determination responsive to the request for authorization determination, and transmitting to the tunneling server module the response;

conducting, by the tunneling server module, communication with the user via the virtual tunnel only after the tunneling server module receives an authorization accept message for the user as said response from the authorization module;

receiving, via the tunneling server module, from the user via the virtual tunnel an Internet request, and forwarding the Internet request to a destination address contained in the Internet request, and receiving, by the tunneling server module, responsive to the Internet request, over the Internet, a reply to the Internet request, and transmitting the reply to the user.

14. The method of claim 13, further comprising assigning, by the tunneling server module, a public IP address for the communication session;

wherein the reply is received by the tunneling server module as addressed to the assigned public IP address;

converting by the tunneling server module the public IP address to a private IP address of the user; and transmitting the reply to the user.

15. The method of claim 14, wherein the translation by the tunneling server module includes a port address translation for the request that translates the private IP address and the port into the public IP address.

16. The method of claim 13, wherein the virtual tunnel established is a layer 2 tunneling protocol tunnel conducted as a point-to-point data link protocol session.

17. The method of claim 13, wherein the communication of the user is a live communication platform entailing real-time information.

18. The method of claim 17, wherein the real-time communication is a voice-over IP communication.

19. The method of claim 13, wherein the tunneling server module is a server located at a data center of an Internet Service Provider, and the authorization module is a RADIUS proxy server located at the data center of the Internet Service Provider, and the remote server is located remotely from the tunneling server module and the authorization module at a data center of a central data center.

20. The method of claim 13, wherein a point-to-point over Ethernet encapsulation is used.

21. A method of identifying a user and providing a virtual tunnel for communication of the user over the Internet, the method comprising, by a tunneling server module:

(A) receiving a user request to communicate over the virtual tunnel pursuant to a virtual tunneling protocol;

(B) transmitting, based on the user request, an authorization request to an authorization module, the authorization request comprising a password, the password having been received by the user from a remote user information server;

(C) receiving, from said authorization module, an authorization determination response; and then, only after the tunneling server module receives as said authorization determination an authorization accept message for the user, (D) conducting communication with the user via the virtual tunnel, including:
  (D)(1) receiving, from the user via the virtual tunnel, an Internet request, and forwarding the Internet request to a destination address contained in the Internet request, and
  (D)(2) receiving, responsive to the Internet request, over the Internet, a reply to the Internet request, and transmitting the reply to the user, wherein
the authorization module: (i) obtained the authorization request from the tunneling server module, (ii) transmitted to a remote authorization server a request for an authorization determination based on said password in the user request; and (iii) responsive to the request for authorization determination, received an authorization determination from the remote authorization server, and (iv) transmitted the authorization determination response to the tunneling server module.

22. The method of claim 21, further comprising:
by the tunneling server module:
  assigning a first IP address for the communication session, wherein the reply received in (D)(2) by the tunneling server module is addressed to the assigned first IP address;
  converting the first IP address to a second IP address associated with the user; and
  transmitting the reply to the user.

23. The method of claim 22 wherein the first IP address is a public IP address and wherein the second IP address is a private IP address.

24. The method of claim 23, wherein address translation by the tunneling server module includes a port address translation for the request that translates the private IP address and the port into the public IP address.

25. The method of claim 22, wherein (i) the tunneling server module comprises a server located at a data center of an Internet Service Provider (ISP), and (ii) the authorization module comprises a Remote Authentication Dial-In User Service (RADIUS) proxy server located at the data center of the ISP, and (iii) the remote user information server is located at location distinct from the tunneling server module and the authorization module.

26. The method of claim 21, wherein the virtual tunnel comprises a layer 2 tunneling protocol tunnel.

27. The method of claim 21, wherein a point-to-point data link protocol session is established for the virtual tunnel.

28. The method of claim 21, wherein the tunneling server module comprises a layer 2 tunneling protocol network server and the authorization module comprises a proxy Remote Authentication Dial-In User Service (RADIUS) server distinct from the layer 2 tunneling protocol network server.

29. The method of claim 28, wherein both the proxy RADIUS server and the tunneling server module are at a data center of an internet service provider.

30. A tunneling server module, operable in a system for identifying a user and for providing a virtual tunnel over the Internet for communications of the user, the tunneling server module configured to:

(A) receive a user request to communicate over the virtual tunnel pursuant to a virtual tunneling protocol;

(B) transmit, based on the user request, an authorization request to an authorization module, the authorization request comprising a password, the password having been received by the user from a remote user information server;

(C) receive, from said authorization module, an authorization determination response; and, only after the tunneling server module receives as said authorization determination an authorization accept message for the user,
  (D)(1) receive, from the user via the virtual tunnel, an Internet request, and forward the Internet request to a destination address contained in the Internet request, and
  (D)(2) receive, responsive to the Internet request, over the Internet, a reply to the Internet request, and transmit the reply to the user, wherein
the authorization module: (i) obtained the authorization request from the tunneling server module, (ii) transmitted to a remote authorization server a request for an authorization determination based on said password in the user request; and (iii) responsive to the request for authorization determination, received an authorization determination from the remote authorization server, and (iv) transmitted the authorization determination response to the tunneling server module.

31. The tunneling server module of claim 30, further configured to:
  assign a first IP address for the communication session, wherein the reply received in (D)(2) is addressed to the assigned first IP address;
  convert the first IP address to a second IP address associated with the user; and
  transmit the reply to the user.

32. The tunneling server module of claim 31 wherein the first IP address is a public IP address and wherein the second IP address is a private IP address.

33. The tunneling server module of claim 32, wherein address translation by the tunneling server module includes port address translation for the request that translates the private IP address and the port into the public IP address.

34. The tunneling server module of claim 30, wherein the tunneling server module comprises a layer 2 tunneling protocol network server and the authorization module comprises a proxy Remote Authentication Dial-In User Service (RADIUS) server distinct from the layer 2 tunneling protocol network server.

* * * * *